US010505682B2

(12) United States Patent
Kim et al.

(10) Patent No.: US 10,505,682 B2
(45) Date of Patent: Dec. 10, 2019

(54) DATA TRANSMISSION AND RECEPTION METHOD AND DEVICE USING CACHING IN WIRELESS COMMUNICATION SYSTEM PERFORMING COMP

(71) Applicants: LG ELECTRONICS INC., Seoul (KR); RESEARCH BUSINESS FOUNDATION SUNGKYUNKWAN UNIVERSITY, Suwon-si, Gyeonggi-do (KR); KOREA ADVANCED INSTITUTE OF SCIENCE AND TECHNOLOGY, Daejeon (KR)

(72) Inventors: Woo Jin Kim, Seoul (KR); Hae Sol Lee, Seoul (KR); Dongin Kim, Seoul (KR); Wan Choi, Seoul (KR); Hanbyul Seo, Seoul (KR); Byounghoon Kim, Seoul (KR)

(73) Assignees: LG ELECTRONICS INC., Seoul (KR); RESEARCH BUSINESS FOUNDATION SUNGKYUNKWAN UNIVERSITY, Suwon-si, Gyeonggi-do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 48 days.

(21) Appl. No.: 15/525,915

(22) PCT Filed: Nov. 10, 2015

(86) PCT No.: PCT/KR2015/012070
§ 371 (c)(1),
(2) Date: May 10, 2017

(87) PCT Pub. No.: WO2016/076611
PCT Pub. Date: May 19, 2016

(65) Prior Publication Data
US 2017/0310438 A1  Oct. 26, 2017

Related U.S. Application Data

(60) Provisional application No. 62/077,866, filed on Nov. 10, 2014.

(51) Int. Cl.
*H04B 7/00* (2006.01)
*H04L 5/00* (2006.01)
(Continued)

(52) U.S. Cl.
CPC ............ *H04L 5/0035* (2013.01); *H04B 7/02* (2013.01); *H04B 7/024* (2013.01); *H04B 7/06* (2013.01);
(Continued)

(58) Field of Classification Search
None
See application file for complete search history.

(56) References Cited

U.S. PATENT DOCUMENTS

2010/0239026 A1\* 9/2010 Kang ............... H04N 21/23432
375/240.25
2011/0115675 A1 5/2011 Sanayei
(Continued)

OTHER PUBLICATIONS

Liu, "Cache-Induced Opportunistic MIMO Cooperation: A New Paradigm for Future Wireless Content Access Networks", 2014 IEEE Informational Symposium on Information Theory, pp. 46-50 (Year: 2014).\*

(Continued)

*Primary Examiner* — Kwang B Yao
*Assistant Examiner* — Juvena W Loo
(74) *Attorney, Agent, or Firm* — Lee Hong Degerman Kang & Waimey

(57) ABSTRACT

The present invention relates to a wireless communication system. More specifically, as a method for transmitting data in a wireless communication system performing a CoMP operation by using a cache, a method for transmitting data, according to the present invention, can comprise the steps of: determining a transmission mode among a plurality of transmission modes on the basis of at least one piece of data stored in the cache; determining data to be transmitted in the transmission mode; and transmitting the data according to the determined transmission mode, wherein the transmission mode can comprise: a first mode for coordinately performing data transmission between coordinated base stations; a second mode for coordinately performing scheduling by sharing channel information between the coordinated base stations; and a third mode for combining the first mode and the second mode.

11 Claims, 21 Drawing Sheets

(51) Int. Cl.
| | | |
|---|---|---|
| | *H04B 7/02* | (2018.01) |
| | *H04B 7/06* | (2006.01) |
| | *H04L 1/00* | (2006.01) |
| | *H04L 29/08* | (2006.01) |
| | *H04L 1/18* | (2006.01) |
| | *H04B 7/024* | (2017.01) |

(52) U.S. Cl.
CPC ......... *H04B 7/0617* (2013.01); *H04B 7/0686* (2013.01); *H04L 1/00* (2013.01); *H04L 1/1887* (2013.01); *H04L 5/0044* (2013.01); *H04L 5/0073* (2013.01); *H04L 67/2842* (2013.01); *H04L 67/32* (2013.01); *H04L 1/1896* (2013.01); *H04L 5/0023* (2013.01); *H04L 5/0055* (2013.01)

(56) References Cited

U.S. PATENT DOCUMENTS

| | | | |
|---|---|---|---|
| 2012/0170677 A1 | 7/2012 | Venturino et al. | |
| 2013/0021925 A1 | 1/2013 | Yin et al. | |
| 2014/0022924 A1* | 1/2014 | Cili | H04W 24/08 370/252 |
| 2014/0094164 A1 | 4/2014 | Hwang et al. | |
| 2014/0201311 A1* | 7/2014 | Lau | H04W 88/08 709/213 |
| 2014/0204871 A1* | 7/2014 | Ode | H04B 7/024 370/329 |
| 2015/0142914 A1* | 5/2015 | Lau | H04L 67/2842 709/217 |
| 2015/0270917 A1* | 9/2015 | Roman | H04J 11/005 370/329 |
| 2015/0381241 A1* | 12/2015 | Ko | H04B 7/024 370/329 |
| 2016/0087694 A1* | 3/2016 | Vilaipornsawai | H04B 7/024 370/329 |
| 2017/0277806 A1* | 9/2017 | Trossen | H04L 67/2842 |
| 2017/0374587 A1* | 12/2017 | Liu | H04L 5/0048 |

OTHER PUBLICATIONS

PCT International Application No. PCT/KR2015/012070, Written Opinion of the International Searching Authority dated Feb. 24, 2016, 23 pages.

Liu, A. et al., "Cache-Induced Opportunistic MIMO Cooperation: A New Paradigm for Future Wireless Content Access Networks," IEEE International Symposium of Information Theory, Jul. 2014, 5 pages.

* cited by examiner

FIG. 6
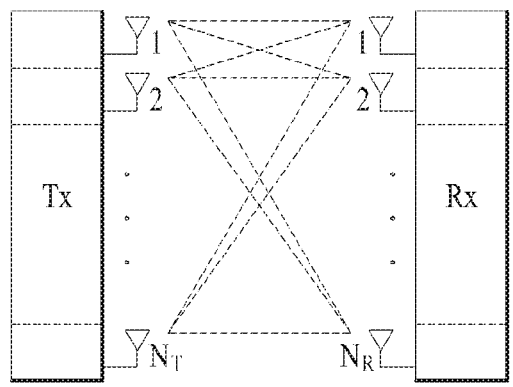
(a)
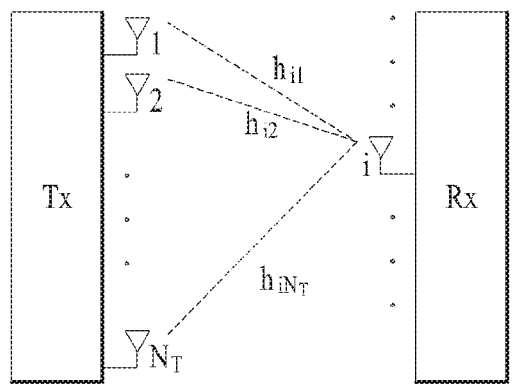
(b)

FIG. 7
(a)
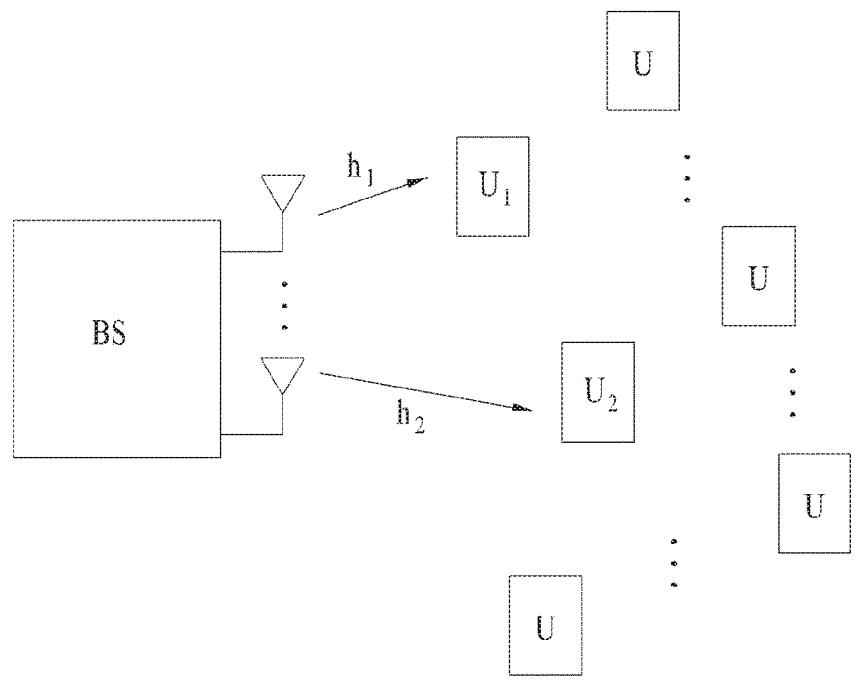
(b)
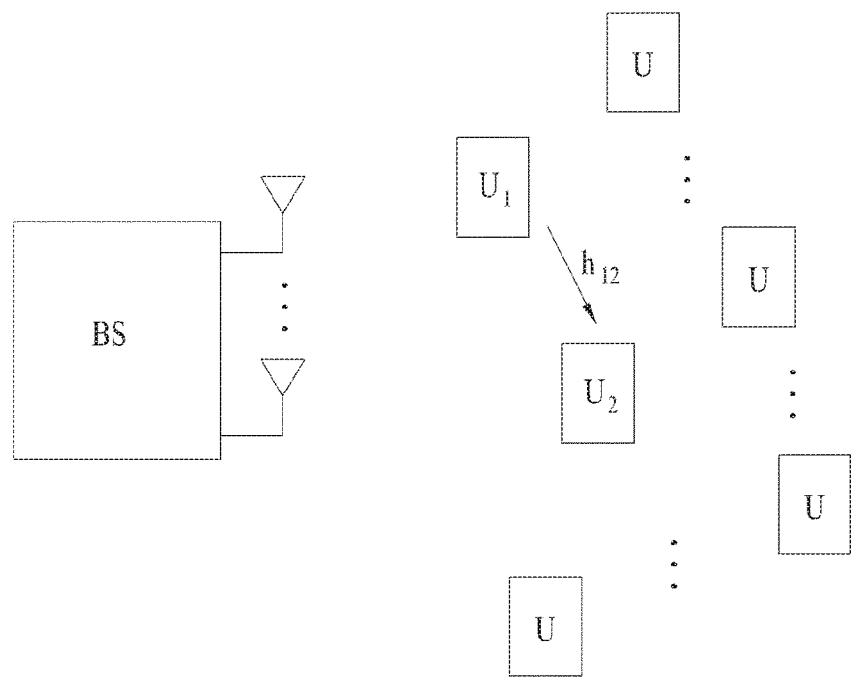

FIG. 11
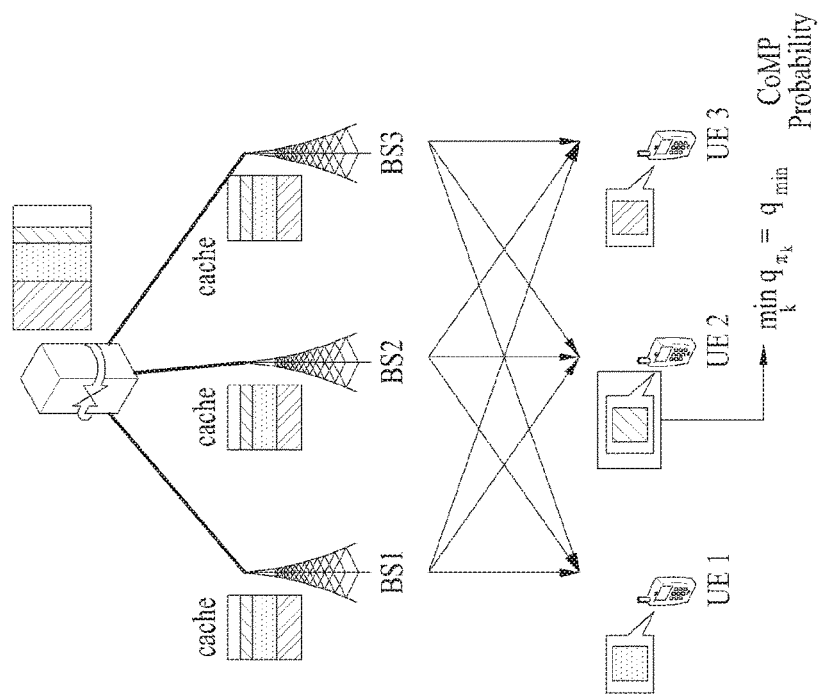
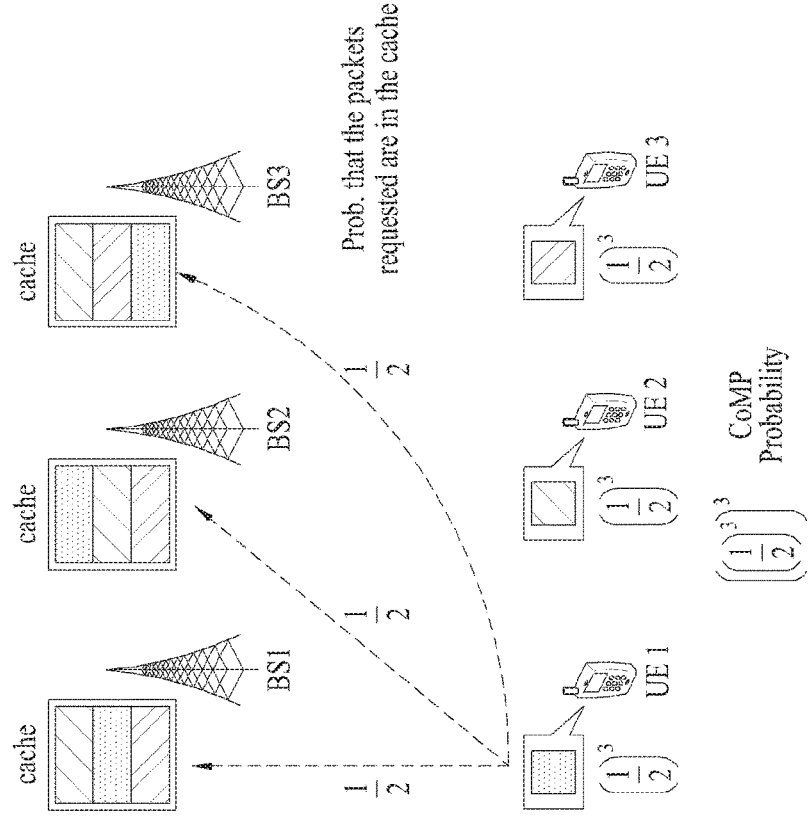

FIG. 14
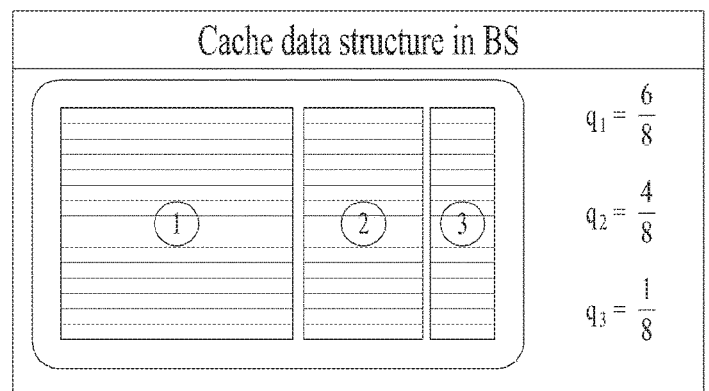
(a)
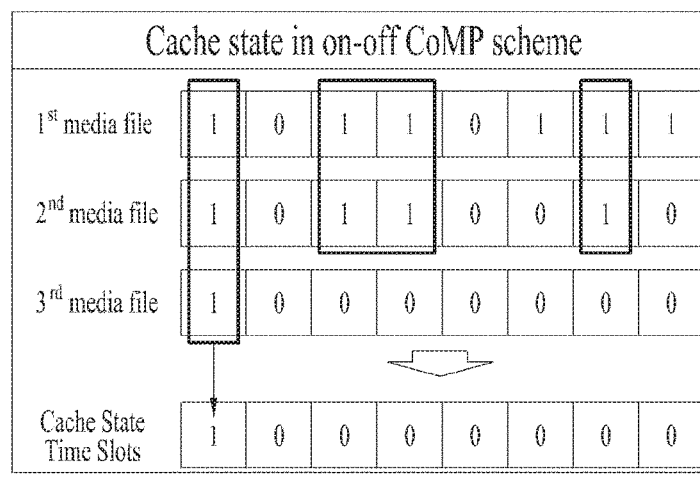
(b)
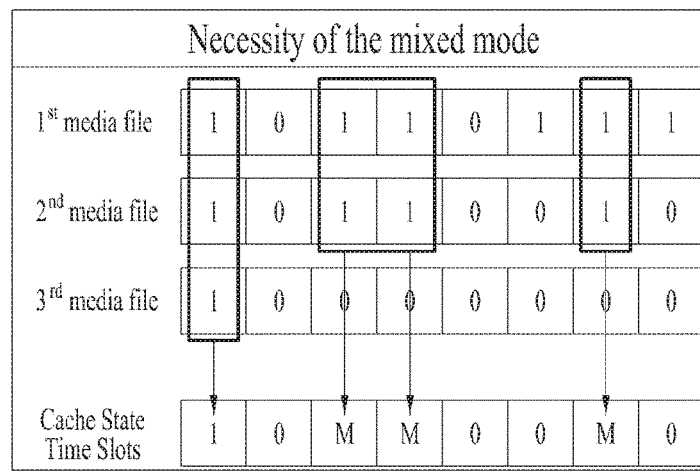
(c)

FIG. 16
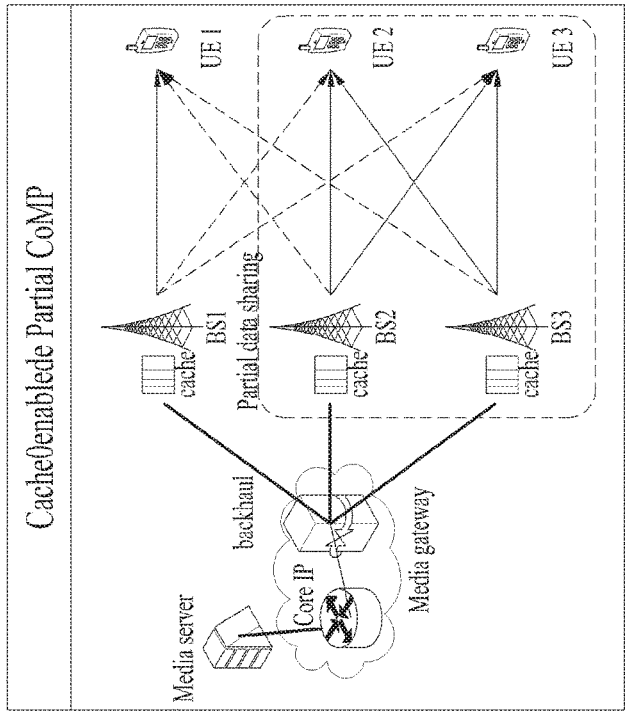
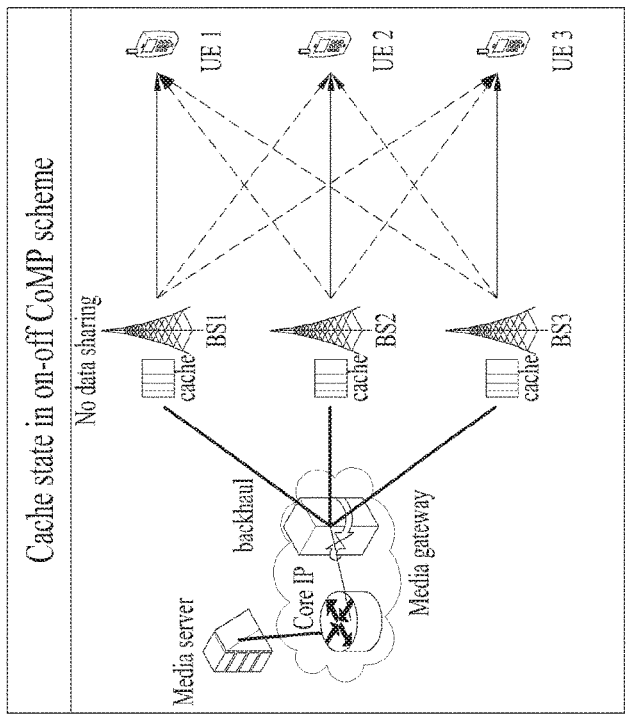

FIG. 18
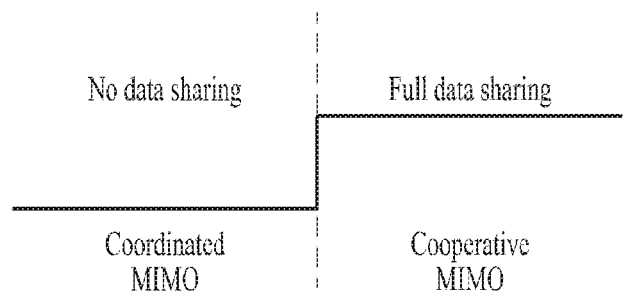
(a)
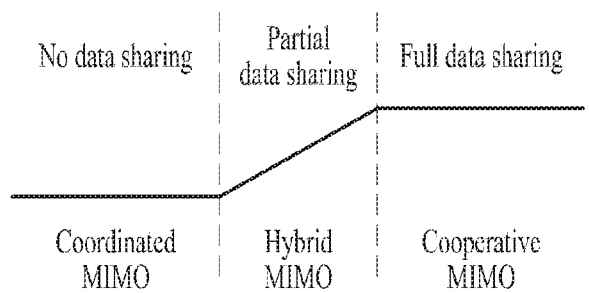
(b)

FIG. 19
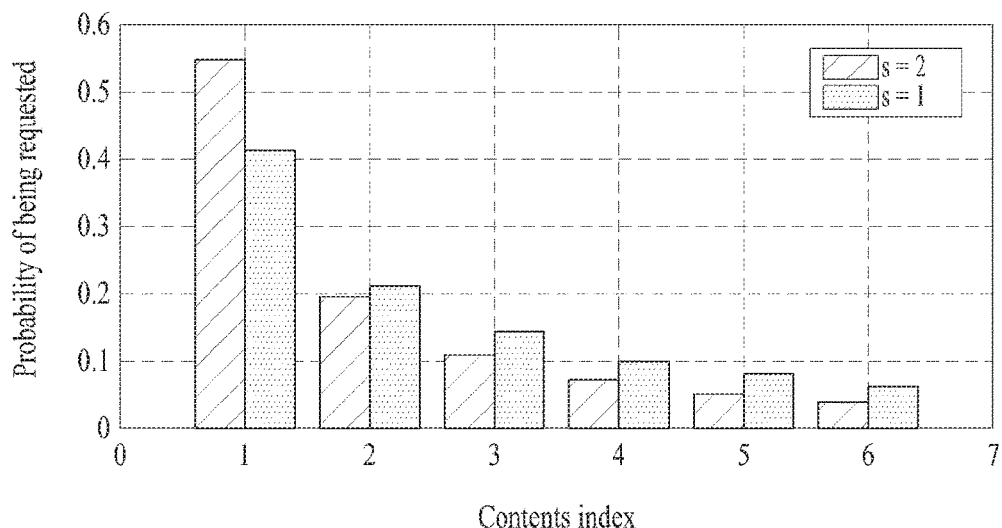
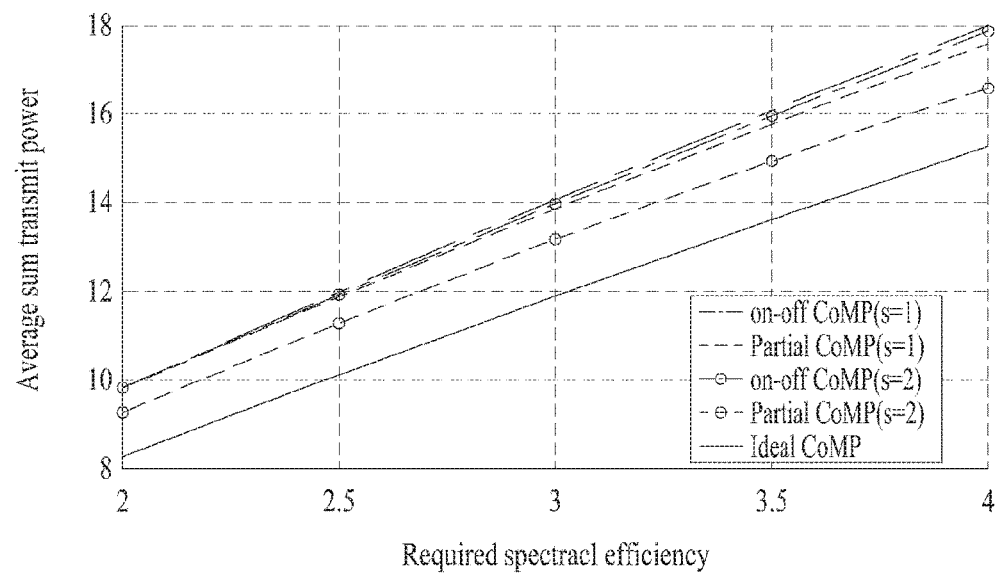

DATA TRANSMISSION AND RECEPTION METHOD AND DEVICE USING CACHING IN WIRELESS COMMUNICATION SYSTEM PERFORMING COMP

CROSS-REFERENCE TO RELATED APPLICATIONS

This application is the National Stage filing under 35 U.S.C. 371 of International Application No. PCT/KR2015/012070, filed on Nov. 10, 2015, which claims the benefit of U.S. Provisional Application No. 62/077,866, filed on Nov. 10, 2014, the contents of which are hereby incorporated by reference herein in its entirety.

TECHNICAL FIELD

The present invention relates to a wireless communication system, and more particularly, to a method and apparatus for transmitting and receiving data using caching in a wireless communication system that performs CoMP.

BACKGROUND ART

FIG. 1 shows a relay node (RN) 120 and user equipments (UEs) 131 and 132 present in an area of one eNodeB (eNB) 110 in a wireless communication system 100. The RN 120 may transmit data received from the eNB 110 to the UE 132 in an RN area and transmit data received from the UE 132 in the relay area to the eNB 110. The RN 120 may extend a high data rate region, enhance communication quality in a cell edge, and support provision of communication inside a building or to an area that exceeds an eNB service area. FIG. 1 shows the case in which there are a UE (hereinafter, referred to as Macro-UE or M-UE) that receives a service directly from an eNB, such as the UE 131, and a UE (hereinafter, referred to as Relay-UE or R-UE) that receives a service through the RN 120, such as the UE 132.

A radio link between the eNB 110 and the RN 120 is referred to as a backhaul link. A link to the RN 120 from the eNB 110 is referred to as a backhaul downlink and a link to the eNB 110 from the RN 120 is referred to as a backhaul uplink. In addition, a radio link between the RN 120 and the UE 132 is referred to as an access link. A link to the UE 132 from the RN 120 is referred to as an access downlink and a link to the RN 120 from the UE 132 is referred to as an access uplink.

When the RN 120 is operated using a method of controlling a cell by the RN 120 itself, the UE 132 may recognize the RN 120 as a general eNB. When another UE functions as the RN 120 (this relay node is referred to as a UE-relay), the UE 132 may not recognize presence of the RN 120.

DISCLOSURE

Technical Problem

An object of the present invention devised to solve the problem lies in a method of successfully transmitting content when CoMP is performed to transmit the content when an eNB transmits the content to a user equipment (UE). In detail, the present invention provides a method of configuring content to be transmitted by performing CoMP when the eNB transmits content to the UE.

Technical problems to be solved by the present invention are not limited to the above-mentioned technical problems, and other technical problems not mentioned herein may be clearly understood by those skilled in the art from description below.

Technical Solution

The object of the present invention can be achieved by providing a method of transmitting data by a base station (BS) in a wireless communication system for performing a CoMP operation using a cache, the method including determining a transmission mode among a plurality of transmission modes based on at least one data stored in the cache, determining data to be transmitted in the transmission mode, and transmitting the data according to the determined transmission mode.

In another aspect of the present invention, provided herein is a method of receiving data by a user equipment (UE) in a wireless communication system for performing a CoMP operation using a cache, the method including receiving a parity bit of data from a serving base station (BS) that operates in a specific transmission mode among a plurality of transmission modes; and restoring the data from the parity bit.

In another aspect of the present invention, provided herein is a base station (BS) for transmitting data in a wireless communication system for performing a CoMP operation using a cache, the BS including a processor configured to determine a transmission mode among a plurality of transmission modes based on at least one data stored in the cache and to determine data to be transmitted in the transmission mode; and a transmitter configured to transmit the data according to the determined transmission mode.

In another aspect of the present invention, provided herein is a user equipment (UE) for receiving data in a wireless communication system for performing a CoMP operation using a cache, the UE including a receiver configured to receive a parity bit of data from a serving base station (BS) that operates in a specific transmission mode among a plurality of transmission modes, and a processor configured to restore the data from the parity bit.

The following features may be commonly applied to exemplary embodiments of the present invention.

Here, the transmission mode may include a first mode for cooperatively performing data transmission between cooperative BSs, a second mode for sharing channel information between the cooperative BSs and cooperatively performing scheduling, and a third mode obtained by combining the first mode and the second mode.

When the at least one stored in the cache includes data requested by a reception user equipment (UE) of each of the cooperative BSs, the transmission mode may be determined as the first mode.

On the other hand, when the at least one data stored in the cache does not include at least one of data requested by a reception user equipment (UE) of each of the cooperative BSs, the transmission mode may be determined as the second mode or the third mode.

The data may be determined as data with a largest number of stored parity bits of the at least one data stored in the cache, and a transmission mode of the data may be a third mode. In this case, according to the third mode, when a serving cell of a UE that makes a request for the data is the BS, the BS may operate in the first mode, and when the serving cell of the UE that makes a request for the data is not the BS, the BS may operate in the second mode.

The at least one data may be encoded based on maximum distance separable (MDS) coding.

Furthermore, the BS may determine a cooperative transmission beamforming vector of transmitted data and, in this case, the cooperative transmission beamforming vector may be determined in consideration of transmission power of the cooperative BSs.

In more detail, the cooperative transmission beamforming vector may be determined to satisfy a following condition, the condition is $$\min_{V_{U_k}} \sum_{k=1}^{k} |V_{G_k}|^2$$

$$\text{s.t.} \quad \frac{|U_k^H H_{k,G_k} V_{G_k}|^2}{\sum_{j \neq k} |U_k^H H_{k,G_j} V_{G_j}|^2 + |U_k^H n_k|^2} \geq 2^{\mu_{\pi_k}} - 1$$

The $V_{G_k}$ may be a cooperative transmission beamforming vector formed by BSs that cooperate with each other in order to transmit information to a $k^{th}$ UE, $U_k$ may be a reception beamforming vector of a $k^{th}$ UE, $H_{k,G_k}$ may be a channel gain between corresponding cooperative BSs and a $k^{th}$ UE, $n_{k'}$ may be noise of a $k^{th}$ UE reception end, and $\mu_{l'}$ may be minimum spectrum efficiency required to detect $l^{th}$ data.

The BS may further perform encoding data stored in the cache to a parity bit, and modulating the parity bit based on adaptive modulation and coding.

The first mode may be an operation mode for processing joint processing and the second mode may be an operation mode for performing cooperative scheduling/beamforming.

It is to be understood that both the foregoing general description and the following detailed description of the present invention are exemplary and explanatory and are intended to provide further explanation of the invention as claimed.

Advantageous Effects

The present invention provides a method of successfully transmitting content when CoMP is performed to transmit the content when an eNB transmits the content to a user equipment (UE). In addition, the present invention provides a method of more effectively transmitting content by performing CoMP when the eNB transmits content to the UE.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure. In the drawings:

FIG. 6 is a diagram showing a structure of a wireless communication system including a multi-input multi-output (MIMO) antenna;

FIG. 7 is a diagram for conceptually explaining a multiple user environment;

FIG. 11 is a diagram illustrating an example of a cache-enabled CoMP system applied to the present invention;

FIG. 14 is a diagram for explanation of necessity of design of CoMP according to the present invention;

FIG. 16 is a diagram for explanation of a difference between a partial CoMP according to a cache state and a CoMP scheme of an on-off method;

FIG. 18 is a diagram for explanation of a technological effect according to the present invention;

FIG. 19 is a diagram for comparison of performance between partial CoMP according to the present invention and a conventional CoMP scheme using a cache;

BEST MODE

Figure 1:
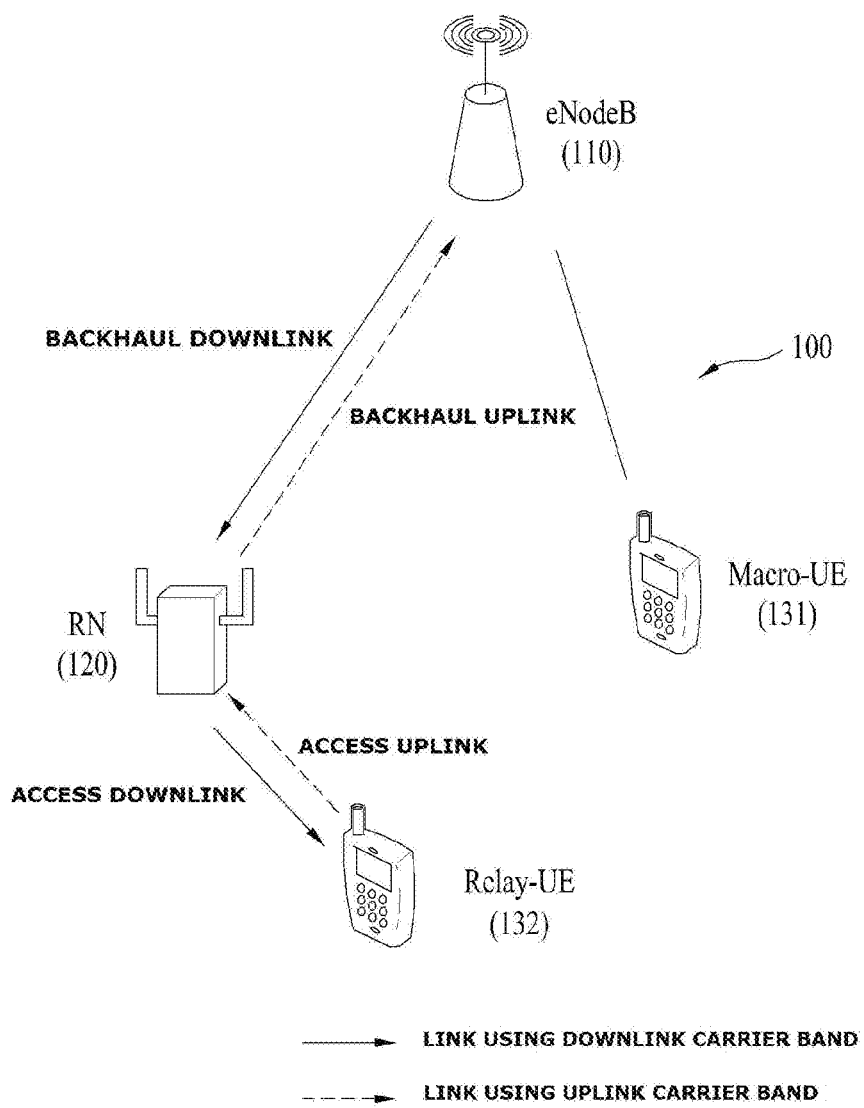
FIG. 1 is a diagram illustrating a wireless communication system including an eNB, a relay, and a user equipment (UE)

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc. In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

The following detailed description includes specific terms in order to provide a thorough understanding of the present disclosure. However, it will be apparent to those skilled in the art that the specific terms may be replaced with other terms without departing the technical spirit and scope of the present disclosure.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

Figure 2:
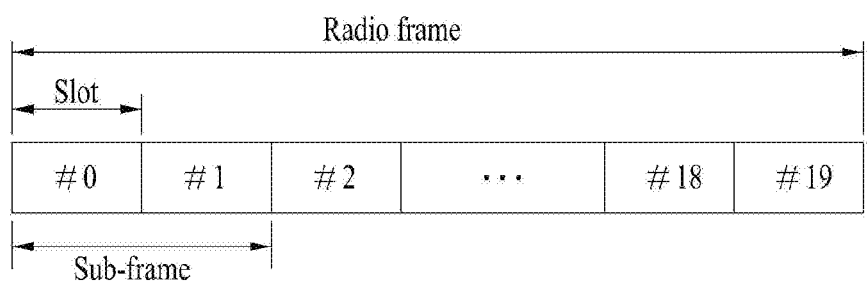
FIG. 2 illustrates the structure of a radio frame in 3GPP LTE system.

FIG. 2 is a diagram illustrating a structure of a radio frame used in a 3GPP LTE system.

Referring to FIG. 2, in a cellular OFDM wireless packet communication system, uplink/downlink data packets may be performed in a unit of a subframe and one subframe may be defined as predetermined time duration including a plurality of OFDM symbols.

The radio frame includes 10 subframes, and one subframe includes two slots in the time domain. A time required to transmit one subframe is defined as a Transmission Time Interval (TTI). For example, one subframe may have a length of 1 ms and one slot may have a length of 0.5 ms. One slot may include a plurality of OFDM symbols or Single Carrier Frequency Division Multiple Access (SC-FDMA) symbols in the time domain. Since an LTE system uses OFDMA in downlink (DL) and SC-FDMA in uplink (UL), the OFDM or SC-FDMA symbol indicates one symbol duration. A Resource Block (RB) is a resource allocation unit and includes a plurality of contiguous subcarriers in one slot. The structure of the radio frame is only exemplary. The number of subframes included in a radio frame, the number of slots included in a subframe, or the number of symbols included in a slot may be changed in various manners.

Figure 3:
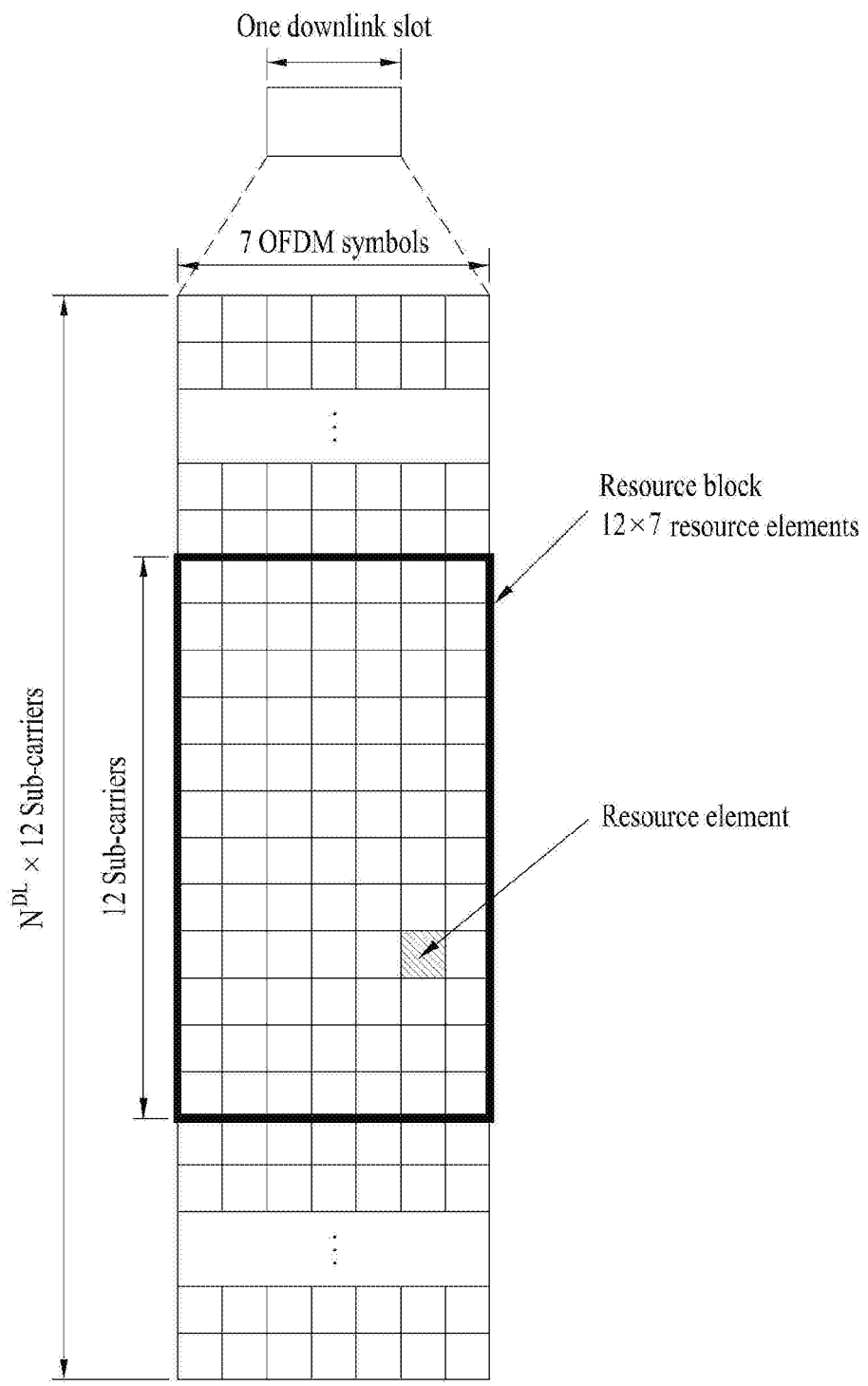
FIG. 3 illustrates a resource grid of a downlink slot.

FIG. 3 is a diagram of a resource grid for a downlink (DL) slot. Referring to FIG. 3, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
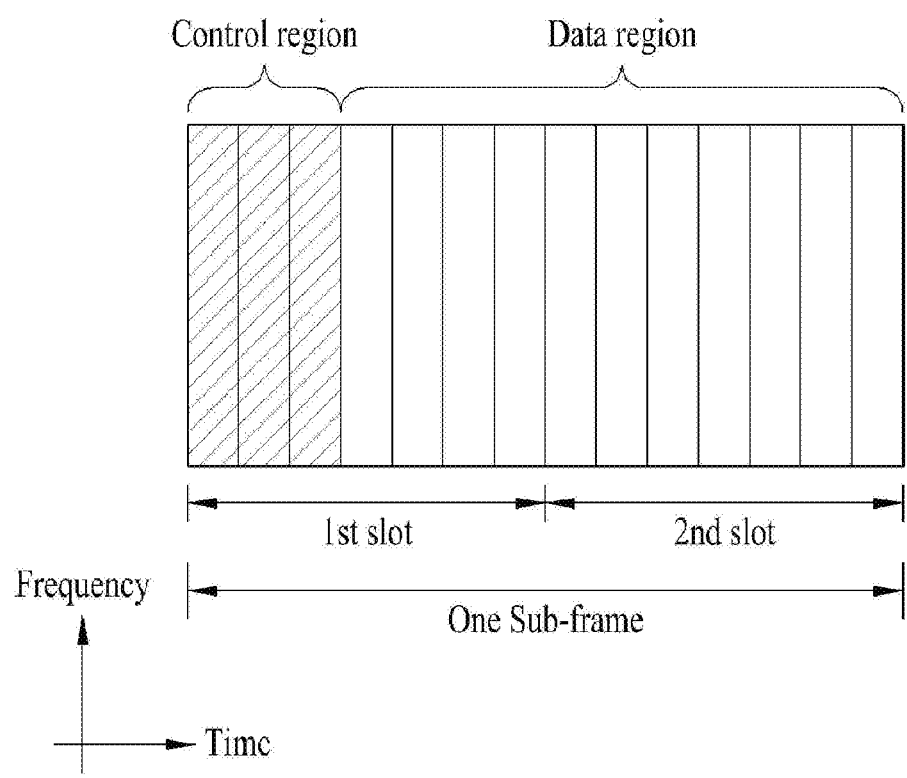
FIG. 4 illustrates the structure of a downlink subframe.

FIG. 4 is a diagram for a structure of a downlink (DL) subframe. Maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. The PDCCH transmits downlink control information (DCI). The DCI includes UL or DL scheduling information according to a format or may include a transmit power control command for a random user equipment group. The PDCCH carries a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information of a higher-layer control message such as a random access response transmitted on the PDSCH, a Tx power control command set for individual UEs in a UE group, a Tx power control command, activation indication information of Voice over IP (VoIP), and the like. A plurality of PDCCHs may be transmitted in the control region. A UE may monitor a plurality of PDCCHs. The PDCCH is transmitted on an aggregate of one or plural contiguous Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of bits of the PDCCH are determined according to the number of CCEs. For example, the CCE aggregation level may be 1, 2, 4, or 8.

A Base Station (BS) determines a PDCCH format according to DCI to be transmitted to a UE and attaches a Cyclic Redundancy Check (CRC) to control information. An identifier (e.g. Radio Network Temporary Identifier (RNTI)) is masked to the CRC according to the owner or purposes of the PDCCH. For example, if the PDCCH is dedicated to a specific UE, an identifier of the UE (e.g. cell-RNTI (C-RNTI)) may be masked to the CRC. If the PDCCH is dedicated to a paging message, a paging identifier (e.g. paging-RNTI (P-RNTI)) may be masked to the CRC. If the PDCCH is for system information (more specifically, a System Information Block (SIB)), a System Information RNTI (SI-RNTI) may be masked to the CRC. If the PDCCH is for a random access response, a Random Access RNTI (RA-RNTI) may be masked to the CRC.

Figure 5:
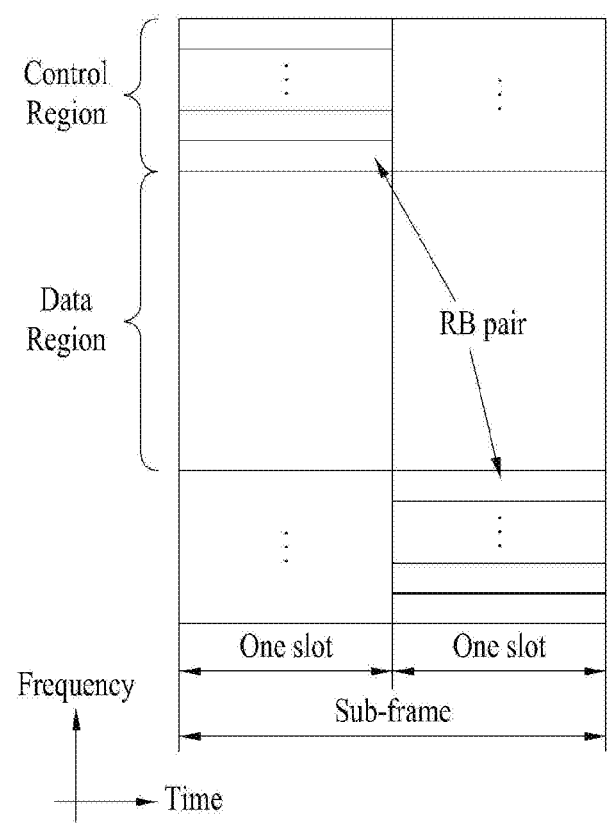
FIG. 5 illustrates the structure of an uplink subframe.

FIG. 5 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

Modeling of Multi-Input Multi-Output (MIMO) Antenna System

FIG. 6 is a diagram showing a structure of a wireless communication system including a MIMO antenna.

As illustrated in FIG. 6A, when the number of transmission antennas is increased to $N_T$ and the number of reception antennas is increased to $N_R$, theoretical channel transmission capacity may be increased in proportion to the number of antennas differently from the case in which a plurality of antennas are used only in a transmitter or a receiver. Accordingly, a transfer rate may be increased and frequency efficiency may be remarkably enhanced. As channel transmission capacity is increased, a transfer rate may be theoretically increased as much as a value obtained by multiplying a maximum transfer rate $R_o$ with a rate increase rate $R_i$ when a single antenna is used.

$$R_i = \min(N_T, N_R) \quad \text{Equation 1}$$

For example, in a MIMO system using four transmit antennas and four reception antennas, it is possible to theoretically acquire a transfer rate which is four times that of a single antenna system. After theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 7, it is assumed that $N_T$ transmit antennas and $N_R$ reception antennas are present.

In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{N_T}]^T \quad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{S}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} + Ps \quad \text{Equation 4}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{Equation 5}$$

$$= W\hat{s} = WPs$$

$W_{ij}$ denotes a weight between an i-th transmit antenna and j-th information. W is also called a weight matrix or a precoding matrix.

When there are $N_R$ reception antennas, received signals $y_1, y_2, \ldots, y_{N_R}$ of each antenna may be represented as a vector as follows.

$$y = [y_1, y_2, \ldots, y_{N_R}]^T \quad \text{Equation 6}$$

When a channel is modeled in a MIMO antenna wireless communication system, the channel may be classified according to a transceiving antenna index. A channel $h_{ij}$ through a reception antenna i from a transmission antenna j will be denoted by $h_{ij}$. It may be noted that an order of an index of $h_{ij}$ is configured by a first index as a reception antenna index and a next index as a transmission antenna index.

FIG. 6B shows a diagram showing a channel to reception antenna i from $N_T$ transmission antennas. The channels may be collected and represented in the form of vectors and matrix. In FIG. 6B, a channel to a reception antenna i from a total of $N_T$ transmission antennas may be represented as follows.

$$h_i^T = [h_{i1}, h_{i2}, \ldots, h_{iN_T}]$$ Equation 7

Accordingly, all channels to $N_R$ reception antennas from $N_T$ transmission antennas may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix}$$ Equation 8

Additive white Gaussian noise (AWGN) through an actual matrix H may be added to an actaul channel. AWGN $n_1, n_2, \ldots, n_{N_R}$ added to $N_R$ reception antennas may be represented as follows.

$$n = [n_1, n_2, \ldots, n_{N_R}]^T$$ Equation 9

A received signal may be represented as follows through the aforementioned equation modeling.

$$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of rows and columns of a channel matrix H indicating a channel state may be determined by the number of transmission and reception antennas. The number of the rows of the channel matrix H may be the same as the number NR of reception antennas and the number of columns may be the same as the number NT of transmission antennas. That is, the matrix of the channel matrix H may be $N_R \times N_T$.

Ranks of the matrix may be defined with a minimum number among the number of independent rows or columns. Accordingly, the ranks of the matrix may be greater than the number of rows or columns. The rank rank(H) of the channel matrix H may be limited as follows.

$$\text{rank}(H) \leq \min(N_T, N_R)$$ Equation 11

With regard to other definition of rank, when a matrix is Eigen-value decomposed, the rank may be defined using the number of Eigen values that are not 0. Similarly, with regard to other definition of rank, when a matrix is singular-value decomposed, the rank may be defined using the number of singular values that are not 0. Accordingly, physical meaning of rank in a channel matrix may refer to the maximum number for delivering different information items in a given channel.

Multiple User-MIMO Operation

Multiple user-MIMO (MU-MIMO) may refer to an operation that simultaneously serves a plurality of users (UEs) by an eNB including a MIMO antenna. Simultaneously, when a plurality of users are served by one eNB, a signal for one UE may operate as interference with respect to another UE and, thus, overall system performance may be degraded. Accordingly, in order to appropriately transmit and receive data according to an MU-MIMO operation, it may be necessary to remove interference between users. To this end, signals to be transmitted to a multiple user from an eNB may be processed using an interference removing scheme.

An eNB may encode a transfer block to be transmitted to each UE in each independent codeword. Encoded codewords may be transmitted using an interference removing scheme. For example, an eNB may transmit a codeword transmitted to a plurality of UEs from one eNB by removing interference. By pre-subtracting a signal transmitted to one UE $U_1$ from a signal transmitted to another UE $U_2$, the UE $U_2$ may receive a signal from the eNB and, thus, may not perform a separate interference removing operation like in the case in which there is no interference. The interference removing scheme may be zero forcing-dirty paper coding (ZF-DPC), zero forcing (ZF), and so on.

First, the ZF-DPC will be described. Assuming the two UEs $U_1$ and $U_2$ that are simultaneously served by one eNB, composite channel $H = [h_1 \ h_2]$ of a channel h1 of $U_1$ and a channel h2 of $U_2$ may be defined. When LQ decomposition is performed on the composite channel H, the composite channel H may be decomposed to lower triangular matrix and orthogonal matrix Q according to Equation 12 below.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix}$$ Equation 12

In Equation 12, when MIMO transmission is performed using a column of a matrix Q as a beamforming vector, only the lower triangular matrix L is left in a signal received by a UE. When an eNB knows all channel environments of each UE, encoding may be performed by transmitting encoded components without interference of a first row while avoiding interference components of a second row. Here, when a beamforming vector wi (that is, a beamforming vector for $U_1$ is $w_1$ and a beamforming vector for $U_2$ is $w_2$) for each UE satisfies $w_i = q_i$, an effective channel may be represented according to Equation 13 below. Accordingly, a signal to one UE is transmitted with interference removed from a signal to another UE and, thus, the corresponding UE may appropriately receive a signal from an eNB without a separate operation of removing interference.

$$h_i w_k = \begin{cases} l_{ii} & i = k \\ 0 & i \neq k \end{cases}$$ Equation 13

Hereinafter, in the case of ZF beamforming, interference may be removed via pseudo-inverse according to Equation 14 below with respect to a composite channel H for a multiple user.

$$F = H^H (H H^H)^{-1}$$ Equation 14

In Equation 14 above, $X^H$ refers to hermit matrix for matrix X and $X^{-1}$ refers to an inverse matrix of matrix X. Each column of matrix F in Equation 14 above is a beamforming vector for each UE. That is, $w_i = f_i$ is satisfied. In this case, an effective channel for each UE may be represented according to Equation 15 below.

$$h_i w_k = \begin{cases} \frac{1}{\|w_i\|} & i = k \\ 0 & i \neq k \end{cases}$$ Equation 15

When the ZF scheme is used, a channel in each UE is an identity matrix and, as a result, a signal with interference pre-removed may be received.

Relay

A relay may be considered for, for example, extension of high-speed data rate coverage, enhancement in group mobility, temporary network arrangement, enhancement in cell edge yield, and/or providing of network coverage in a new region.

Referring back to FIG. 1, the RN 120 may forward transmission and reception between the eNB 110 and the UE 132 and two types of links (backhaul link and access link) with different attributes may be applied to each carrier frequency band. The eNB 110 may include a donor cell. The RN 120 may wirelessly access a wireless-access network through the donor cell.

When the backhaul link between the eNB 110 and the RN 120 uses a downlink frequency band or downlink subframe resource, the backhaul link may be represented by a backhaul downlink and, when the backhaul link between the eNB 110 and the RN 120 uses an uplink frequency band or uplink subframe resource, the backhaul link may be represented by a backhaul uplink. Here, the frequency band is resource allocated in a frequency division duplex (FDD) mode and the subframe is resource allocated in a time division duplex (TDD) mode. Similarly, when an access link between the RN 120 and the UE 132 uses a downlink frequency band or downlink subframe resource, the access link between the RN 120 and the UE 132 may be represented by an access downlink and, when the access link between the RN 120 and the UE 132 uses an uplink frequency band or uplink subframe resource, the access link between the RN 120 and the UE 132 may be represented by an access uplink. FIG. 1 shows setting of backhaul uplink/downlink and access uplink/downlink of an FDD mode relay.

An eNB requires uplink receiving and downlink transmitting functions and a UE requires uplink transmitting and downlink receiving functions. A relay requires all of a backhaul transmitting function to an eNB, an access uplink receiving function to a UE, a backhaul downlink receiving function from an eNB, and an access downlink transmitting function to a UE.

With regard to use of a band (or spectrum) of a relay, the case in which a backhaul link operates in the same frequency band as an access link is referred to as 'in-band' and the case in which a backhaul link and an access link operate in different frequency bands is referred to as 'out-band'. In both in-band and out-band, a UE (hereinafter, referred to as a legacy UE) that operates according to a legacy LTE system (e.g., release-8) needs to access a donor cell.

According to whether a UE recognizes a relay, the relay may be classified into a transparent relay or a non-transparent relay. The transparency refers to the case in which the UE is not capable of recognizing communication with a network through a relay and the non-transparency refers to the case in which the UE is capable of recognizing communication with a network through a relay.

With regard to control of a relay, the relay may be classified into a relay configured as a portion of a donor cell or a relay that autonomously controls a cell.

The relay configured as a portion of a donor cell may have a relay identification ID but may not have a cell identity of the relay itself. When at least a portion of radio resource management (RRM) is controlled by an eNB to which a donor cell belongs (even if the remaining portions of the RRM are positioned in the relay), the relay may be configured as a portion of a donor cell. In detail, the relay may support a legacy UE. For example, the relay may correspond to smart repeaters, decode-and-forward relays, various types of L2 (second layer) relays, and a type-2 relay.

With regard to the relay that autonomously controls a cell, the relay may control one or more cells, provide a unique physical layer cell identity to each cell controlled by the relay, and use the same RRM mechanism From a point of UE view, the case in which the UE accesses a cell controlled by the relay is not different from the case in which the UE accesses a cell controlled by a general eNB. In detail, the cell controlled by the relay may support a legacy UE. For example, the relay may correspond to a self-backhauling relay, an L3 (third layer) relay, a type-1 relay, and a type-1a relay.

The type-1 relay may control a plurality of cells as an in-band relay and a UE may deem each of the plurality of cells as a separate cell differentiated from a donor cell. In addition, a plurality of cells may have unique physical cell ID (which is defined in LTE release-8) and the relay may transmit a synchronization channel, a reference signal, and so on of the relay. In the case of a single-cell operation, the UE may directly receive scheduling information and HARQ feedback from the relay and transmit a control channel (scheduling request (SR), CQI, ACK/NACK, etc.) of the UE to the relay. In addition, the legacy UEs (which is a UE that operates according to LTE release-8 system) may deem the type-1 relay as a legacy eNB (which is a UE that operates according to LTE release-8 system). That is, backward compatibility is present. UEs that operate according to an LTE-A system may deem the type-1 relay as an eNB different from a legacy eNB and provide enhancement in performance.

A type-1a relay may have the same feature as the aforementioned type-1 relay except that the relay operates in out-band. The operation of the type-1a relay may be configured to minimize or avoid influence on an L1 (first layer) operation.

The type-2 relay may not have a separate physical cell ID as an in-band relay and, accordingly, may not form a new cell. The type-2 relay may be transparent to the legacy UE and the legacy UE may not recognize presence of the type-2 relay. The type-2 relay may transmit a PDSCH but may not transmit at least CRS and PDCCH.

Hybrid Automatic Repeat Request (HARQ) Operation

As a method of controlling failure in data reception, the following HARQ operation may be applied. When a data transmitting side transmits one packet and then receives an ACK signal from a data receiving side, a new packet is transmitted and, when the data transmitting side receives a NACK signal, a pre-transmitted packet may be retransmitted. In this case, a packet with encoding applied thereto according to a forward error correction (FEC) function may be retransmitted. Accordingly, the data receiving side may transmit an ACK signal when decoding is successful as a result of receiving and decoding one packet and may transmit NACK and store a receive packet in a buffer when decoding fails. In addition, when a retransmitted packet according to the NACK signal is received, the retransmitted packet may be combined with the packet received in the buffer and decoding is performed and, thus, a reception success rate of a packet may be enhanced.

The HARQ operation may be classified into a synchronous HARQ method and an asynchronous HARQ method according to retransmission timing. In the synchronous HARQ method, when initial transmission fails, next retransmission may be performed at a time point determined by a system. For example, when retransmission is determined to be performed every fourth time unit (e.g., subframe) after initial transmission fails, it may not be necessary to further notify a receiving side of information on a retransmission time point. Accordingly, upon receiving a NACK signal, a data transmitting side may retransmit a packet every fourth time unit until an ACK signal is received. In the asynchronous HARQ method, information on a retransmission time point may be separately scheduled. Accordingly, a retransmission time point of a packet corresponding to a NACK signal may be changed according to various factors such as a channel state.

According to whether a channel state is applied to the amount of resource used during retransmission, the HARQ method may be classified into an adaptive HARQ method and a non-adaptive HARQ method. The non-adaptive HARQ method may be performed with an MCS level of a retransmitted packet, the number of used resource blocks, and so on, which are determined during initial transmission. For example, when a transmitting side transmits data using 8 resource blocks during initial transmission, the transmitting side may also retransmit data using 8 resource blocks in the same way during next retransmission. The adaptive method may include a packet modulation method, a method of varying the number of resource blocks, etc. according to a channel state. For example, when data is transmitted using 8 resource blocks during initial transmission, data may also be retransmitted using resource blocks equal to or less than 8 resource blocks according to a channel state during next retransmission.

With regard to the aforementioned data packet transmitting operation via HARQ, a transmitting end may convert a data packet into a sub packet with a predetermined size and perform initial transmission and retransmission in a sub packet unit. A receiving end may combine a plurality of packets and attempt to decode a data packet.

A plurality of sub packets used in initial transmission and retransmission using an HARQ method may be generated from one codeword packet. In this case, the plurality of generated sub packets may be identified according to the length of a sub packet and a start position of the sub packet. The sub packet to be identified as such is referred to as a redundancy version (RV). The receiving end may receive and combine different RVs to attempt to decode all codewords. For example, as a method of receiving packets by as much as a difference between all codeword packets to be received and already received sub packets to attempt to decode the data, the HARQ operation may be performed and this method may be referred to as an HARQ method of an incremental redundancy (IR) method.

Transmission of Some Signals Through Relay in Multiple User Environment

FIG. 7 is a diagram for conceptually explaining a multiple user environment. In an example of FIG. 7, it is assumed that an eNB includes a MIMO antenna and supports MU-MIMO transmission and that UEs $U_1$, $U_2$, . . . include a single antenna. However, this assumption is merely an example for clarity of description and, thus, a principle according to the present invention, to be described below, may also be applied to UE(s) including MIMO antennas in the same way.

Referring to FIG. 7A, a plurality of UEs $U_1$, $U_2$, . . . may receive a signal from a base station BS. A channel to $U_1$ may be referred to as $h_1$ and a channel to $U_2$ may be referred to as $h_2$. It may be assumed that $U_1$ is positioned closest to the BS to have a good channel state but $U_2$ is positioned at a cell edge to have a poor channel state compared with $U_1$. In order to ensure data transmission to the UE with a poor channel state, the BS may transmit a signal with high power but issues such as interference may occur. In order to overcome the issue, the aforementioned various relays may be introduced. However, when a new relay is installed in a network, a separate resource needs to be used and, thus, a method for allowing a UE with a good channel state to perform a function of a relay among a plurality of UEs may be considered. The relay may be referred to as a UE-relay and the UE-relay may correspond to the aforementioned type-2 relay. That is, the UE-relay may be transparent to a UE that receives data.

FIG. 7B illustrates the case in which $U_1$ functions as a UE-relay and $U_2$ receives data from a BS through $U_1$. As such, data transmission is performed through cooperation between UEs in a multiple user environment and, thus, overall transmission capacity and efficiency of resource usage may be enhanced. For example, compared with other UEs, a UE $U_1$ with a good channel environment with an eNB may function as a UE-relay and may help data transmission to another UE $U_2$ with a poor channel environment. In detail, $U_1$ may receive data of $U_1$ from the eNB and, simultaneously, receive data transmitted to $U_2$ from the eNB. $U_1$ may transmit data to be transmitted to $U_2$ among data received by $U_1$ to $U_2$. $U_2$ may acquire data of $U_2$ through data that is directly received from an eNB and data transmitted through $U_1$. This data transmitting method may be referred to as a partial signal transmitting method.

Figure 8:
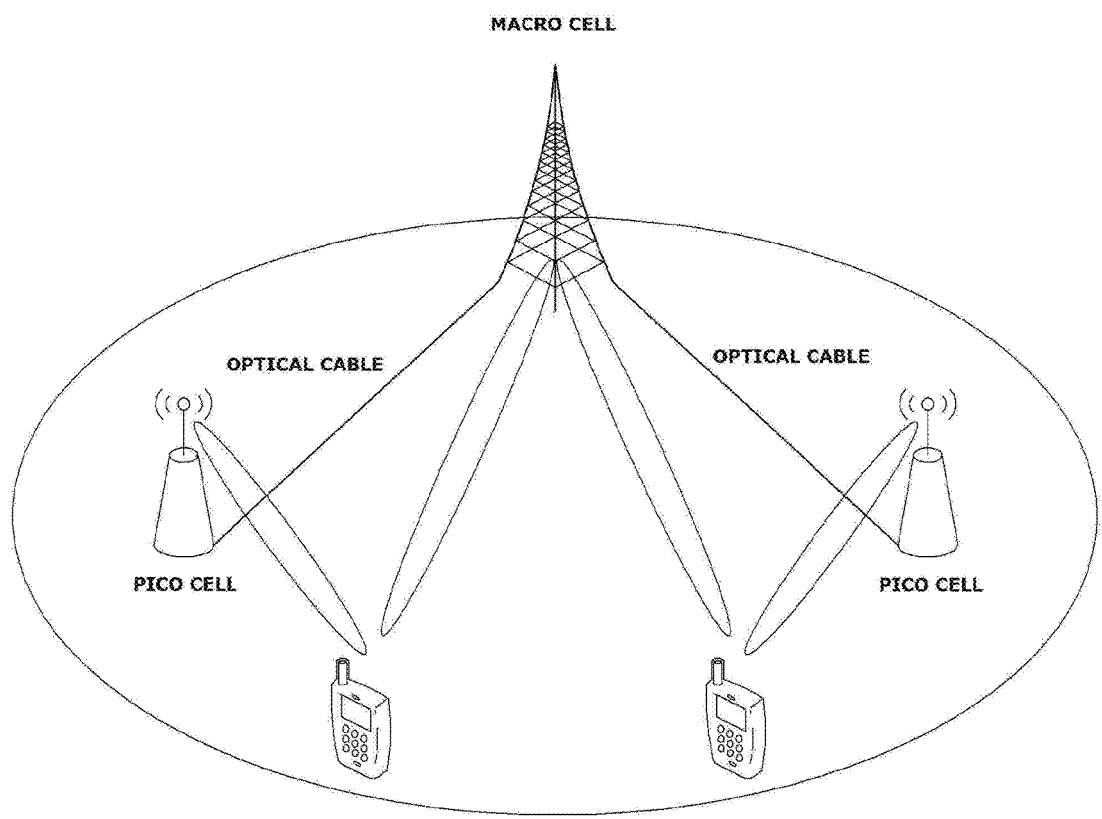
FIG. 8 is a diagram illustrating a configuration of a heterogeneous network to which a CoMP scheme is applied.

FIG. 8 is a diagram illustrating a configuration of a heterogeneous network to which a CoMP scheme is applied. In particular, FIG. 8 shows a network including a radio remote head (RRH) that transmits and receives a signal with relatively low transmission power to and from a macro eNB. Here, a radio remote head (RRH) or a pico eNB positioned in coverage of the macro eNB may be connected to the macro eNB through an optical cable, and so on.

As seen from FIG. 8, transmission power of the RRH is relatively lower than transmission power of the macro eNB and, thus, coverage of each RRH is relatively lower than coverage of the macro eNB.

Such a CoMP scenario may cover a coverage hole of a specific area through added RRHs compared with a system present only in a legacy macro eNB or expect gain with overall enhanced system throughput via cooperative transmission of a plurality of transmission points (TPs) using a plurality of TPs including an RRH.

In FIG. 8, RRHs may be classified into two cases. In one case, RRHs are assigned different cell identification (cell-ID) from the macro eNB and each of the RRHs are considered as another small cell and, in another case, all of the RRHs operate with the same cell-IDs as the macro eNB.

Supply of a wireless communication device such as a smart phone remarkably increases radio data and it is expected that recently increasing demand for large amount of multimedia content services accelerates increase in mobile data traffic. In order to satisfy the increasing demand for network capacity, a CoMP scheme for transmitting information via cooperation between eNBs has been proposed.

The CoMP scheme has potential for changing a cross-link interference signal to a multiplexing gain by sharing information between eNBs but has a limitation in that a large capacity of backhaul between eNBs is needed in order to share a large amount of information in real time. In addition, transmission of desired content to a user within a short time functions as an important factor for measuring a service and, thus, there is a limit in terms of delay.

Cache-Enabled CoMP (Cache-Enable Cooperative Multi Point)

As a solution for largely alleviating the above issue while obtaining gain of the CoMP, research into cache-enabled CoMP that introduces a cache to an eNB has been proposed. The cache-enable CoMP is a method of cooperatively transmitting content to a UE by eNB that performs CoMP when content requested by the UE is present in a cache of the eNB. Differently from a legacy data service, a video streaming service does not use a bit that is arbitrarily configured, as a source any longer and, thus, a cache between eNBs may be considered so as to pre-store some of media files in a cache in consideration of popularity of the media files. Accordingly, gain of CoMP in which payload information is opportunistically shared may be obtained without additional help of a large capacity of backhaul.

Hereinafter, the present invention proposes a method of storing a parity bit generated by maximum distance separable (MDS) decoding a media file stored in a cache in the above case. In addition, arrangement of the media file in the cache for optimizing performance and transceiving beamforming optimization of eNBs and users are performed. Therethrough, a high amount of wireless video streaming service may be provided while significantly overcoming a limitation of a legacy CoMP scheme. When a service of a video streaming network is evaluated, maintaining of a predetermined level of transfer rate is an important factor compared with temporarily providing of a high maximum transfer rate. Accordingly, the present invention proposes an optimization method of minimizing transmission power of eNBs while enduring a predetermined transfer rate.

MDS Encoding Caching Scheme

Figure 9:
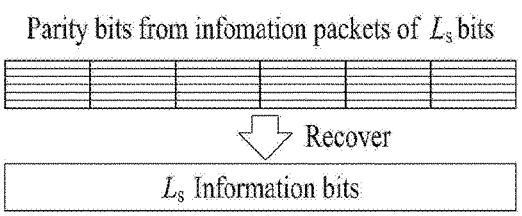
FIG. 9 is a diagram for explanation of the characteristics of MDS encoding.
Figure 10:
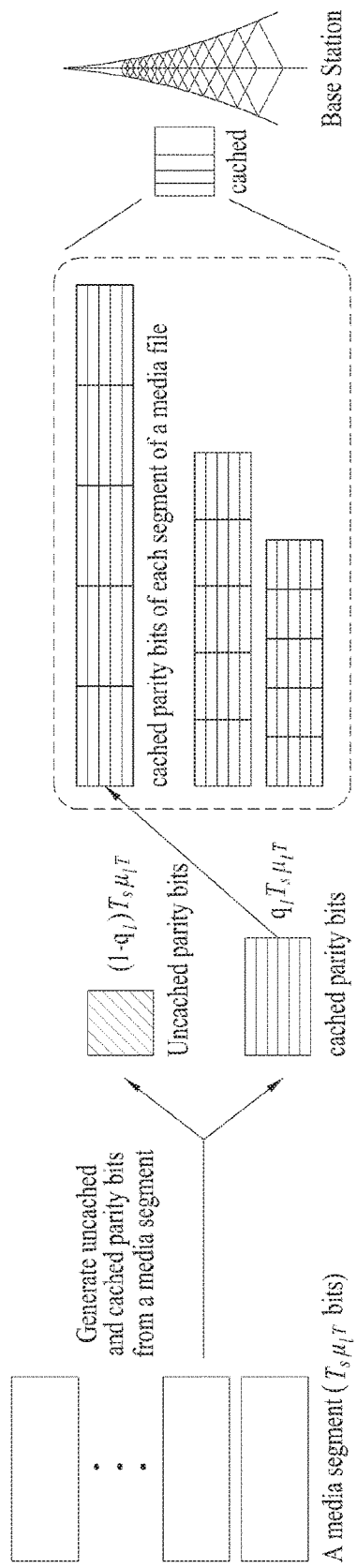
FIG. 10 is a diagram illustrating a procedure of storing content in a cache of an eNB via MDS encoding.

FIG. 9 is a diagram for explanation of the characteristics of MDS encoding and FIG. 10 is a diagram illustrating a procedure of storing content in a cache of an eNB via MDS encoding.

Referring to FIG. 9, an MDS code is a rateless code having characteristics whereby existing information is completely recovered when only a specific L bit among parity bits generated from existing information configured with L bits.

According to caching using MDS encoding, as illustrated in FIG. 10, media files may be encoded with parity bits via MDS encoding in a unit of a segment and some of the media files may be temporarily stored in a cache. For convenience of description, a ratio of bits stored in a cache to parity bits generated from each block of a first media file is defined as $q_i \in [0,1]$.

Referring to FIG. 10, each media file may be stored in a cache of an eNB through an eNB. In more detail, a parity bit stored in a cache in a block of a first media file is a bit corresponding to a result value obtained by multiplying a block bit $T_s\mu_i T$ of a first media file by $q_i$. On the other hand, a parity bit that is not stored in a cache is a bit corresponding to a result obtained by multiplying $1-q_i$.

As such, a configuration of storing the same amount of media files in caches of all eNBs via MDS encoding has a great difference from a configuration of arbitrarily storing media files in terms of CoMP possibility.

FIG. 11 is a diagram illustrating an example of a cache-enabled CoMP system applied to the present invention. FIG. 11A shows the case in which a random caching scheme is used for cache-enabled CoMP and FIG. 11B shows the case in which an MDS coding-based caching scheme is used. In a description of FIG. 11, it is assumed that a size of a cache is given such that ½ of each media file is stored in the cache when three eNBs and three UEs are present.

According to the assumption, when a media file is randomly (brute-force) stored in the cache, as illustrated in FIG. 11A, the possibility that a media file requested by a user is present in a corresponding eNB is ½ and the corresponding media file needs to be present in other eNBs BS2 and BS3 for CoMP and, thus, total possibility is $(½)^3$. However, the possibility that materials requested by other users who receive a service to other eNBs BS2 and BS3 are present in all eNBs is $(½)^3$ and the possibility that CoMP is performed is just $((½)^3)^3$.

On the other hand, as illustrated in FIG. 11B, when an MDS code is used as long as a predetermined amount of parity bits is received even if any parity bit is used, original information is recovered and, thus, total CoMP possibility is $q_{m,n} = \min_k q_{n_j} = ½$. The present invention proposes a configuration of storing the same media file in caches of all eNBs via MDS encoding to enhance the possibility of obtaining a CoMP gain.

CoMP Transmission Mode and Cache State

Figure 12:
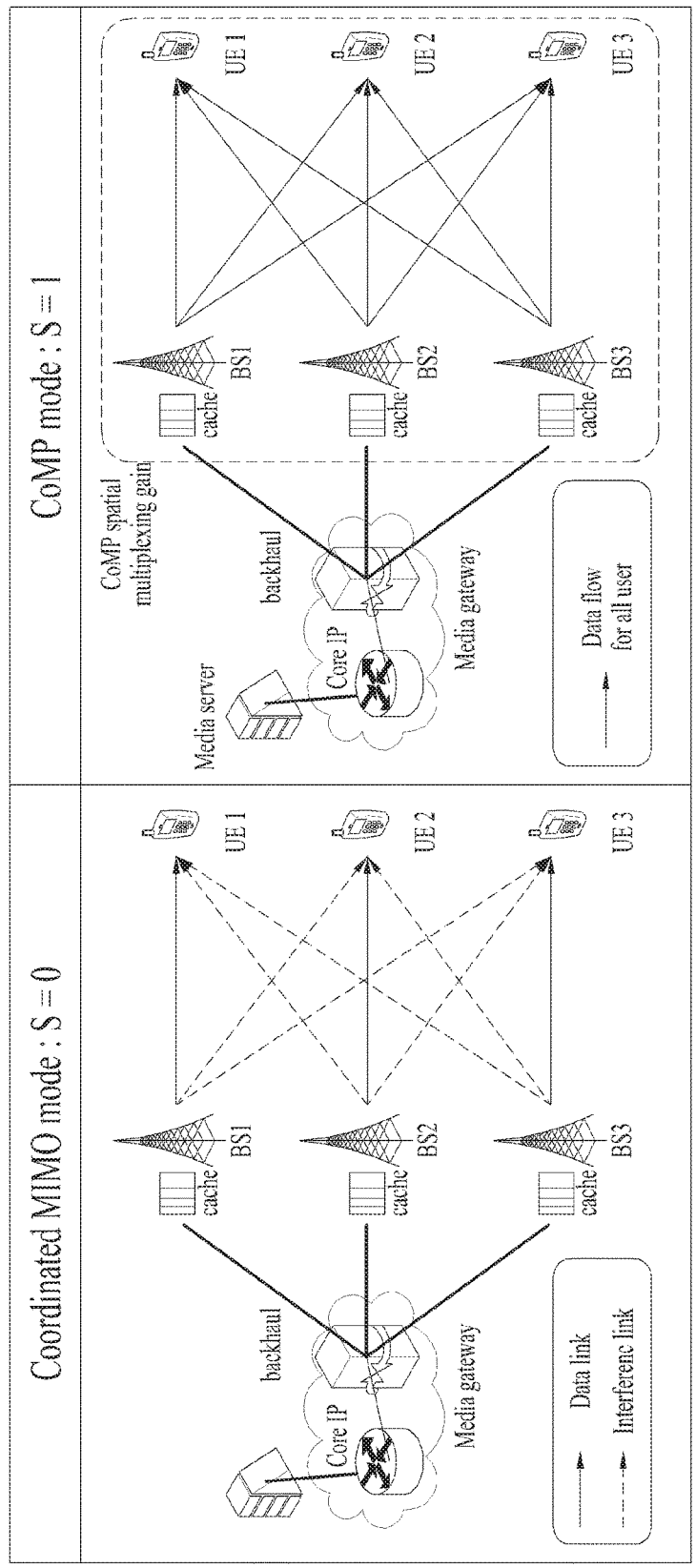
FIG. 12 shows caching for each transmission mode in a cache-enabled CoMP situation.

FIG. 12 shows caching for each transmission mode in a cache-enabled CoMP situation.

In cache-enabled CoMP, there are two types of transmission modes, a coordinated MIMO mode and a CoMP mode are present according to a state of a media file stored in a cache. The coordinated MIMO may refer to a cooperative scheduling/beamforming method that is a method of sharing each channel information item and transmitting unique information only to each user. The CoMP mode may correspond to a method of obtaining a CoMP gain using information stored in a cache by all eNBs. In more detail, the CoMP mode may refer to joint processing that is a method of sharing data information stored in a cache as well as channel information of each eNB by all eNBs that participate in CoMP. Here, a parameter $S \in \{0,1\}$ indicating a cache state is defined and, in this case, S=0 refers to a coordinated MIMO mode and S=1 refers to a CoMP mode.

Figure 13:
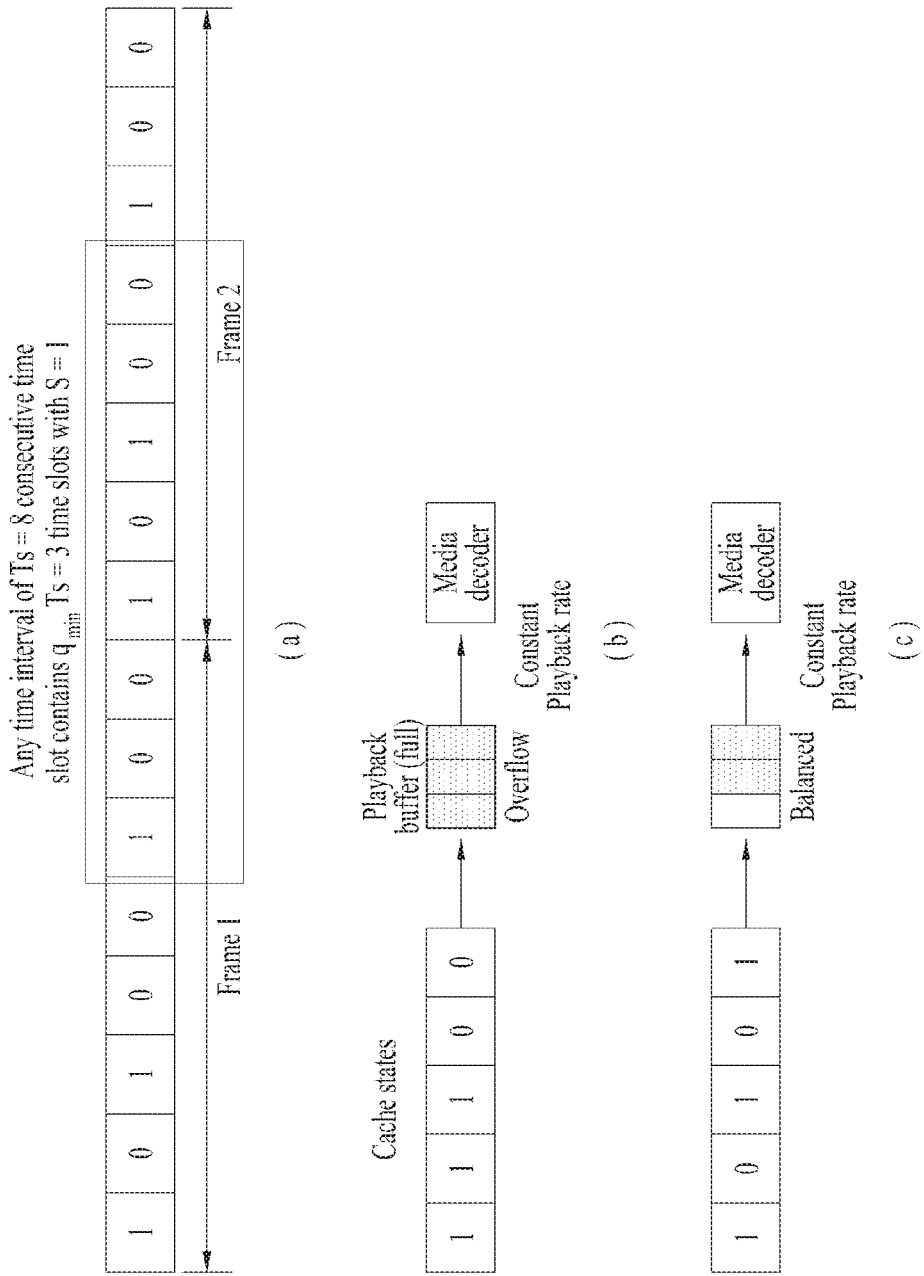
FIG. 13 is a diagram for explanation of a state of a cache in a cache-enabled CoMP situation.

FIG. 13 is a diagram for explanation of a state of a cache in a cache-enabled CoMP situation.

FIG. 13 shows the state of the cache assuming that one frame includes 8 time slots. Here, as illustrated in FIG. 13A, it is assumed that three ($q_{min}T_s=3$) time slot with S=1 is contained every eight time slot (Ts=8 ms) period. Referring to FIG. 13B, when three slots are continuously assigned S=1, overflow whereby a space is sufficient in terms of a playback buffer of a UE may occur. On the other hand, referring to FIG. 13C, when slots are harmoniously assigned S=1 in terms of all caches, a predetermined buffer level may be maintained. That is, when a cache state is harmoniously distributed, a predetermined buffer level may be maintained in terms of a playback buffer of a UE and, thus, more stable communication may be achieved.

As described above, according to the cache-enabled CoMP technology, there are only two transmission modes including a CoMP mode (S=0) in which all eNBs perform transmission using information stored in a cache and a coordinated MIMO mode (S=1) in which any eNB does not use information stored in a cache. The CoMP mode (S=1) may be selected only when all currently requested media files are left in a cache.

Referring to FIG. 14A, it is assumed that each media file is present in a cache with a ratio of 6/8 ($q_1$), 4/8 ($q_2$), and 1/8 ($q_3$) assuming three media files. FIG. 14B shows CoMP of an on-off method (S∈{0,1}).

Referring to FIG. 14B, it may be assumed that a first media file is stored in six slots of eight slots of a cache according to possibility of 6/8, a second media file is stored in four slots of eight slots, and a third file is stored in one slot of eight slots. In this case, according to CoMP of an on-off method, all media files are present in a first slot and, thus, a cache state may correspond to S=1 in the first time slot. That is, an eNB may operate in a CoMP mode only in a first time slot and operate in a coordinated mode in the remaining time slot. Accordingly, according to conventional CoMP of an on-off method, when media files, a small amount of which is stored in a cache, that is, media files with low popularity are requested, reduction in a CoMP mode may occur and use of a cache may be reduced.

As such, it is deemed that CoMP of an on-off method in which all eNBs use or do not use a cache is used in terms of information sharing and a new transmission mode for enabling soft quantization instead of hard quantization illustrated in FIG. 14C needs to be introduced.

The present invention proposes a method of adding a mode with s=m other than s=0 and s=1 to use a cache in CoMP transmission, as illustrated in FIG. 14C. In order to perform such an operation, the aforementioned MDS encoding is assumed to be performed.

In a description of FIG. 14C, it is assumed that a frame includes eight slots and that a slot index 0 is started in the corresponding frame but this is for convenience of description and, thus, the present invention is not limited thereto. Referring to FIG. 14C, a time slot index 0 (first slot) has all media files and, thus, a mode with s=1 is executed in a corresponding slot. In addition, all media files are present in a slot index 1 and, thus, a mode with s=0 is executed. Two media files are present in time slot indexes 2, 3, and 6 and, thus, referring to FIG. 14B, s=0 may be set and, referring to FIG. 14C, a new mode M may be defined and a mode with s=M (mixed mode) may be executed.

According to the mixed mode, a more flexible CoMP operation is capable of being performed and, thus, the mixed mode may be advantage in terms of use of resources. Accordingly, the present invention proposes a more enhanced cache-enabled CoMP scheme and, hereinafter, the cache-enabled CoMP scheme according to the present invention will be referred to as partial CoMP. A conventional CoMP scheme of an on-off method will be referred to as an on-OFF CoMP scheme.

According to the present invention, an additional transmission mode (mixed mode) in which some eNBs perform CoMP may be considered and, thus, soft quantization may be enabled in terms of information sharing and information stored in a cache may be more effectively used.

Figure 15:
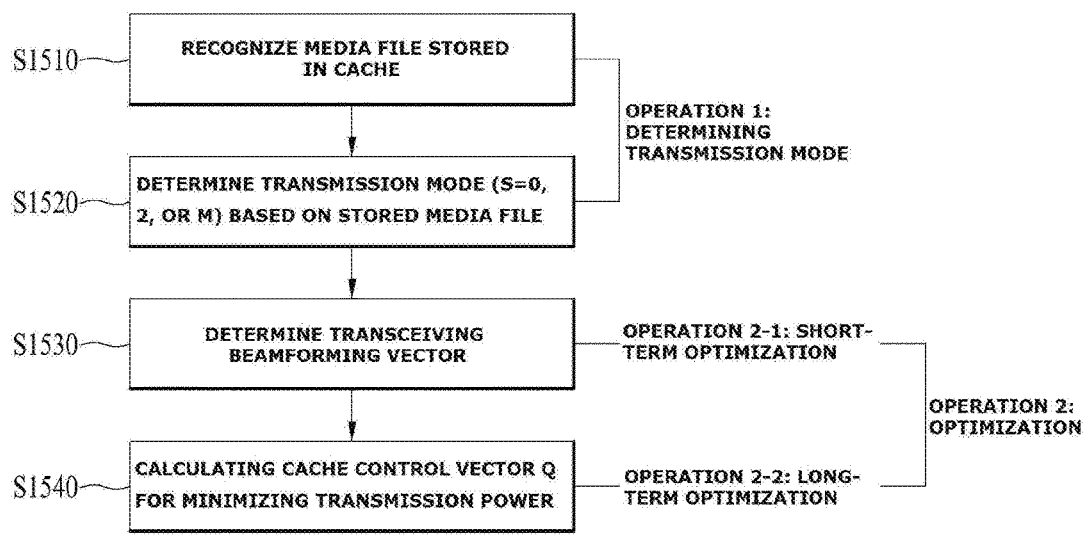
FIG. 15 is a schematic diagram illustrating an operation of partial CoMP according to the present invention.

FIG. 15 is a schematic diagram illustrating an operation of partial CoMP according to the present invention.

Referring to FIG. 15, the operation according to the present invention may be largely divided into a transmission mode determining operation and an optimization operation and the optimization operation may be divided into a short-term optimization operation and a long-term optimization operation.

Here, the transmission mode determining operation may include recognizing a media file stored in a cache (S1510) and determining a transmission mode based on the stored media file (S1520). The transmission mode determining operation may include mapping a transmission mode for transmission and a media file to be transmitted in the corresponding transmission mode.

eNBs in each time slot may use one of three modes (s=0, m, or 1). Here, a time period in which each mode is maintained in one frame may be determined according to the amount of media files stored in a cache from currently requested media files and the media files may be store via MDS encoding.

When all media files requested by a UE that is served by each eNB remain in a cache, an effect of sharing payload information may be obtained and all eNBs may perform CoMP (s=1). On the other hand, when only some of requested files remain in a cache and a file that occupies a largest size among the media files still remains in the cache, only eNBs that serve users who make a request for a corresponding file may selectively perform CoMP and other eNBs may perform partial CoMP of sharing only channel information and performing coordinated MIMO (s=m). Lastly, when the files stored in the cache are also used, all eNBs may perform coordinated MIMO of sharing only channel information (s=0).

According to the present invention with the above three transmission modes, transmission power may be largely minimized through short-term optimization and long-term optimization.

The short-term optimization operation may be an operation of controlling an effect of an interference signal through optimization of beamforming that satisfies a predetermined minimum required SINR value in each mode. The short-term optimization operation may include determining a set of cooperative eNBs and determining a transceiving beamforming vector so as to minimize transmission power between eNBs (S1530).

The long-term optimization operation may be an operation of optimizing arrangement of media files stored in each cache to control balance of modes constituting a frame. The long-term optimization operation may include calculating transmission power of eNBs and calculating a cache control vector q for minimizing the transmission power (S1540).

FIG. 16 is a diagram for explanation of a difference between a partial CoMP according to a cache state and a CoMP scheme of an on-off method.

FIG. 16A shows a cache state of CoMP of an on-off method and a cache state of CoMP according to the present invention. Here, it is assumed that a transmission time period is divided into frame units, each frame includes $T_s$. (Ts=8) time slots, and some media files remain in a fifth slot corresponding to index 4.

In this case, the cache state of CoMP of an on-off method may be set with s=0. As a result, referring to FIG. 16B, an eNB may transmit a media file stored in a fifth slot to a UE that makes a request for the corresponding file and may perform coordinated MIMO for reducing interference on other UEs.

According to the present invention, in a situation of FIG. 16A, eNBs BS2 and BS3 in a fifth slot may perform CoMP, may cooperatively transmit the stored file, and may transmit the file to UEs UE2 and UE3 that make a request for the corresponding file. However, another eNB BS1 may share only channel information and perform coordinated MIMO.

The present invention assumes a multiple input and output network in which both an eNB and a user have a plurality of antennas in consideration of a downlink environment in which users makes a request for a wireless video streaming service.

Hereinafter, the partial CoMP according to the present invention will be described in more detail.

1. Transmission Mode Determining Operation

According to the present invention, a parameter S indicating a cache state may be defined and S may have one value of $S \in \{0,M,1\}$. For convenience, a message requested by a $k^{th}$ user is defined as $\pi_k$, a set of eNBs that cooperate with each other in order to transmit a message to a $k^{th}$ UE is defined as $G_k$, and a ratio of a first media file to file files stored in a cache is defined as $q_l \in [0,1]$.

A cache control vector as a vector including $q_l$ of media files is defined as $q=\{ql, \ldots, q_L\}$ and two parameters $q_{min}=\min_k q_{\pi_k}$ and $q_{max}=\max_k q_{\pi_k}$ are defined. In this case, eNBs in each time slot may use one of the following transmission modes according to S.

1) CoMP Mode (S=0)

When all media files requested by current UEs remain in a cache, all eNBs may have share information and obtain multiplexing gain via cooperative MIMO. Here, $G_k$ may be defined according to $G_k=\{1, \ldots, K\}$.

2) Mixed Mode (S=M)

CoMP may be performed on UEs that make a request for files, a largest amount of which is stored in a cache, among media files that are currently requested by UEs. In this case, CoMP may be performed by sharing information between eNBs that provide a service to a corresponding UE. For example, BS2 and BS3 of FIG. 16C may perform CoMP on UE 2 and UE3. The remaining eNBs may share only channel information and all eNBs may perform beamforming so as to minimize an interference signal. Here, $G_k$ may be defined according to $G_k=\{k|q_{\pi_k}=\max\{q_{\pi_j}\}, j\in\{1 \ldots, K\}\}$.

3) Coordinated MIMO Mode (S=1)

When entire information of files, a largest amount of which is stored in a cache, among requested media files is used, all eNBs may transmit data only to a UE to which a corresponding eNB provides a service and perform beamforming for minimizing an interference signal by sharing channel information. Here, $G_k$ may be given according to $G_k=\{k\}$.

A signal that is received by a $k^{th}$ UE in the three transmission modes may be represented in one general form below.

$$y_k = H_{k,G_k} V_{G_k} s_k + \sum_{j \neq k} H_{k,G_j} V_{G_j} s_j + n_k \quad \text{Equation 16}$$

Here, $V_{G_k}$ may refer to a cooperative transmission beamforming vector formed by eNBs that cooperate with each other in order to transmit information to a $k^{th}$ UE, $H_{k,G_k}$ may refer to a channel gain between corresponding cooperative eNBs and a $k^{th}$ UE, $s_k$ refers to a message for a $k^{th}$ UE, and $n_k$ refers to noise of a $k^{th}$ UE reception end.

2. Mixed Timescale (Two-Level) Optimization

As described above, the present invention is largely embodied according to two aspects of short-term and long-term aspects. In terms of the short-term aspect, a transceiving beamforming vector for minimizing transmission power while satisfying a size of a given transmission power in each mode may be designed. In terms of the long-term aspect, arrangement of media files stored in a limited size of cache may be optimized and, thus, three modes may be adjusted so as to minimize transmission power.

Figure 17:
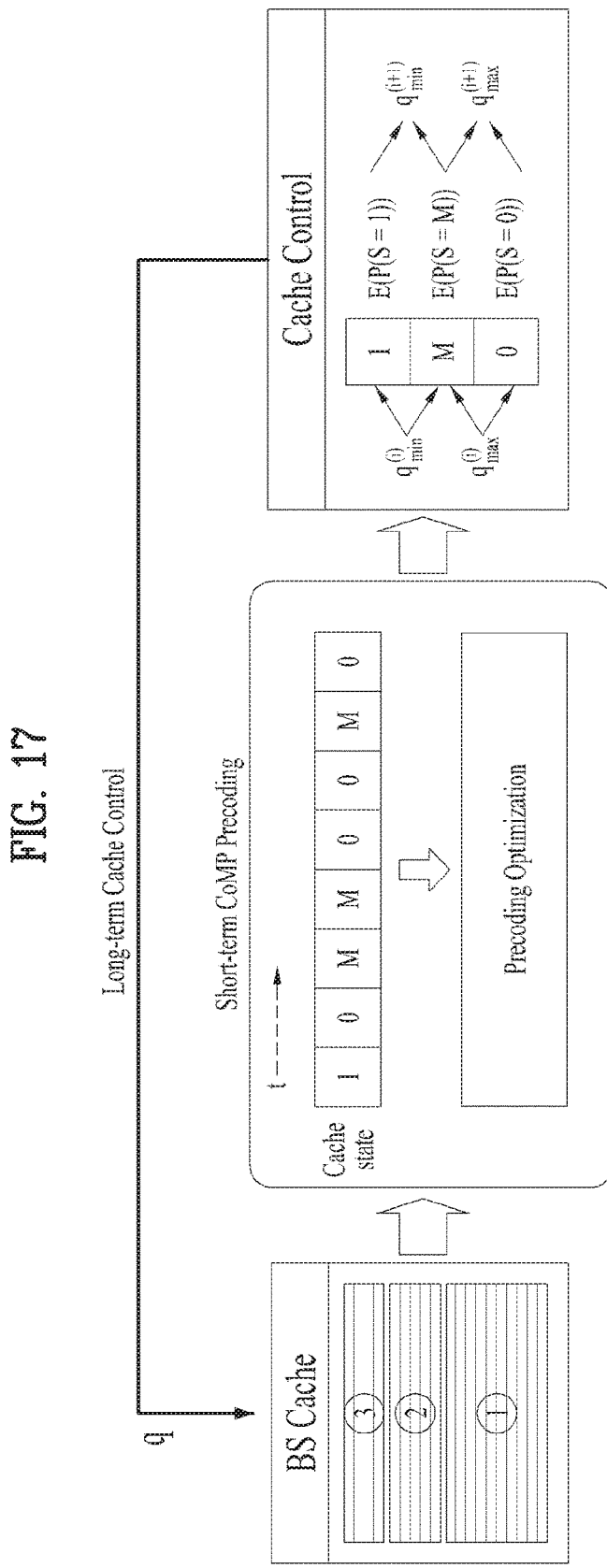
FIG. 17 is a diagram for explanation of an optimization procedure applied to the present invention.

FIG. 17 shows a procedure of performing optimization including two operations. The two operations may be performed as follows.

1) Short-Term Beamforming

A mode may be determined according to a cache state for each given time slot and a set $G_k$ of eNBs that cooperate with each other by sharing information according to the determined mode may be determined. Under a limitation in which a minimum SINR value required by all UEs is ensured, a transceiving beamforming vector may be designed according to Equation 17 below so as to minimize transmission power of eNBs.

$$\min_{V_{G_k}} \sum_{k=1}^{K} |V_{G_k}|^2 \quad \text{Equation 17}$$

$$\text{s.t.} \quad \frac{|U_k^H H_{k,G_k} V_{G_k}|^2}{\sum_{j \neq k} |U_k^H H_{k,G_j} V_{G_j}|^2 + |U_k^H n_k|^2} \geq 2^{\mu_{\pi_k}} - 1$$

Here, $V_{G_k}$ refers to a cooperative transmission beamforming vector formed by eNBs that cooperate with each other in order to transmit information to a $k^{th}$ UE, $U_{k'}$ refers to a reception beamforming vector of a $k^{th}$ UE, and $\mu_l$ refers to minimum spectrum efficiency required to detect a $l^{th}$ media file.

2) Long-Term Cache Optimization

It is assumed that a media file requested by a UE is changed according to a long-term aspect. Accordingly, optimization of a cache control vector and q may also be performed with a long-term period. As described above, a ratio of an $1^{th}$ media file stored in a cache to media files is defined as $q_l \in [0,1]$, a cache control vector as a vector including ql of media files is defined as $q=\{q_l, \ldots, q_L\}$, and two parameters $q_{min}=\min_k q_{\pi_k}$ and $q_{max}=\max_k q_{\pi_k}$ are defined.

Assuming that each block of a media file has a size of $T_s\mu_l\pi$ and transmission is performed over total time of $T_S$, time points corresponding to the three modes may be sequentially represented by $q_{min}T_s$, $(q_{max}-q_{min})T_s$, and $(1-q_{max})T_s$. Accordingly, the three transmission modes may be controlled according to $q=\{q_l, \ldots, q_L\}$ and a frequency of generating each mode may be represented by $q_{min}$ and $q_{max}$ according to Equation 18 below.

Prob($S$=0):$1-q_{max}$

Prob($S$=M):$q_{max}-q_{min}$

Prob($S$=M):$q_{min}$ [Equation 18]

Total transmission of each mode may be determined according to duration time of each mode and, accordingly, may be represented according to Equation 19 below.

$P_{total}=(1-q_{max})E[P_{CoMP}(V)]+(q_{max}-Q_{min})E[P_{mixed}(V)]+q_{min}E[P_{coord}(V)]$ Equation 19

According to the present invention, optimization q for minimizing the total transmission power $P_{total}$, under a limitation with a given cache size may be designed according to Equation 20 below.

$$\min_{q} P_{total} \quad \text{Equation 20}$$

$$\text{s.t.} \sum_{l=1}^{L} q_l F_l \leq B_C$$

Here, $F_{l'}$ is a size of a $l_{th}$ media file and $B_c$ is a size of a cache.

A media file requested by a UE is changed according to given popularity but the information is not pre-recognized and, thus, optimization of a cache control vector may be repeatedly performed. q may be updated using Stochastic Subgradient Algorithm according to Equation 21 every time $T_s$ and optimized q may be obtained via repetition.

$$\frac{\partial \psi^{(i)}}{\partial q_l} = 1(l = \pi_{k_{min}}^{(i)})(E[P_{CoMP}(V)] - E[P_{mixed}(V)]) + \quad \text{Equation 21}$$

$$1(l = \pi_{k_{max}}^{(i)})(E[P_{mixed}(V)] - E[P_{coord}(V)])$$

$$q^{(i+1)} = \arg\min_{q \in D_q} \left\| q^{(i)} - \alpha^{(i)} \frac{\partial \psi^{(i)}}{\partial q^{(i)}} - q \right\|^2$$

3. Experimental Result

Performances are different according to a degree by which popularity of media files is unequally concentrated into a specific file and a size of a cache. FIG. 18 is a diagram showing a difference of technological effects between the conventional technology and the present invention.

As illustrated in FIG. 18A, according to the conventional technology, when information is shared or not shared during use of a cache, only binary (on-off) determination is possible. On the other hand, as illustrated in FIG. 18B, according to the present invention, a mode of partially sharing information may be added and, thus, information stored in a cache is advantageously and appropriately used.

FIG. 19 is a diagram for comparison of performance between partial CoMP according to the present invention and a conventional CoMP scheme using a cache. It is assumed that each media file follows Zipf distribution and the drawing shows distribution according to a value 's' for determining a degree by which popularity is concentrated and performance according to the distribution. It may be seen that total transmission power required to satisfy corresponding QoS at given transmission speed according to each distribution is induced and reduction in transmission power according to the present invention is increased as concentration of popularity is further increased.

4. Additional Performance Enhancement

The present invention relates to a method of additionally obtaining a gain of CoMP by permitting partial CoMP to more effectively use a cache in an environment an eNB in a wireless video streaming network has a cache.

According to the proposed present invention, differently from the conventional technology of on-off CoMP in terms of use of a cache, soft transition of cache use may be enabled to obtain a more enhanced CoMP gain. The partial CoMP may have more enhanced performance when the partial CoMP is combined with adaptive modulation & coding (AMC) control.

Figure 20:
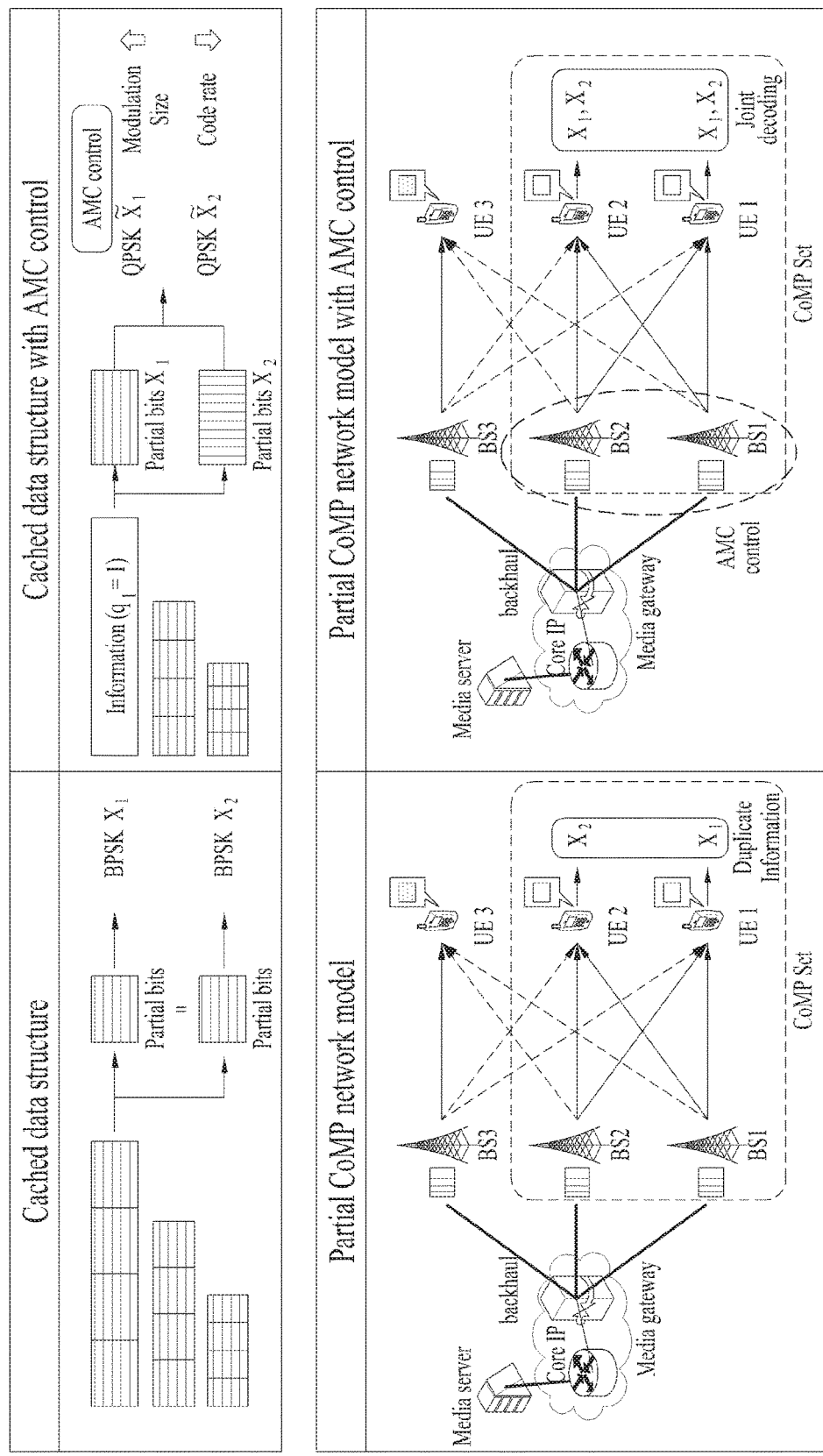
FIG. 20 is a diagram illustrating the case in which partial CoMP and AMC are combined according to another exemplary embodiment of the present invention.

FIG. 20 is a diagram illustrating the case in which partial CoMP and AMC are combined according to another exemplary embodiment of the present invention.

In CoMP with AMC control combined therewith as illustrated in FIG. 20, short-term AMC control and long-term cache optimization may be performed.

1) Short-Term AMC Control

A set of eNBs that currently participate CoMP may be defined according to $\Pi = \arg\max_{G_k} |G_k|$ and may be given according to $\Pi = \{1, \ldots, K\}$ with S=0 in which all eNBs participate CoMP. When a requested user request profile (URP) information is the same media file, $\pi_i = \pi_j$, $q_{\pi_j}=1$ ($i,j \in \pi$, $i \neq j$), eNBs that participate in CoMP may encode an information bit stored in $q_{\pi_i}$ to $|\Pi|$; partial bits and extend a modulation level to a $2^{|\Pi|}$-QAM signal from an existing BPSK signal via AMC control.

2) Long-Term Cache Optimization

When a media file with $l_{th}$ popularity satisfies $q_l=1$ in a cache control vector optimized with a long-term period, an information bit instead of a parity bit may be stored in caches of eNBs to reduce the amount of redundant information present in conventional q vector optimization.

This method may correspond to a method of obtaining an additional code gain via AMC control by storing an information bit instead of a parity bit to generate different parity bits from even the same information during a maximum distance separable (MDS) encoding procedure of one media file in the case of a media file with high popularity. According to the conventional technology, the same parity is stored in an eNB with respect to one media file and, thus, even if signals for the same media file transmitted to another UE are detected, a gain may not be obtained. On the other hand, in the latter case of combination with AMC control, an effect of additionally enhancing performance may be obtained using diversity of parity bits.

The present invention may relate to a scheme for minimizing transmission power via a cooperative multiple point transmission scheme by a plurality of macro base stations (MBSs) including a cache in a wireless video streaming network and, in detail, according to the present invention, a utilization degree of CoMP may be enhanced using an MDS code, arrangement of media files stored in a cache of an eNB and beamforming of MBSs may be optimized so as to perform file arrangement and beamforming with minimized transmission power. In addition, a utilization degree of information stored in a cache may be enhanced through a partial cooperative multiple point transmission scheme.

Figure 21:
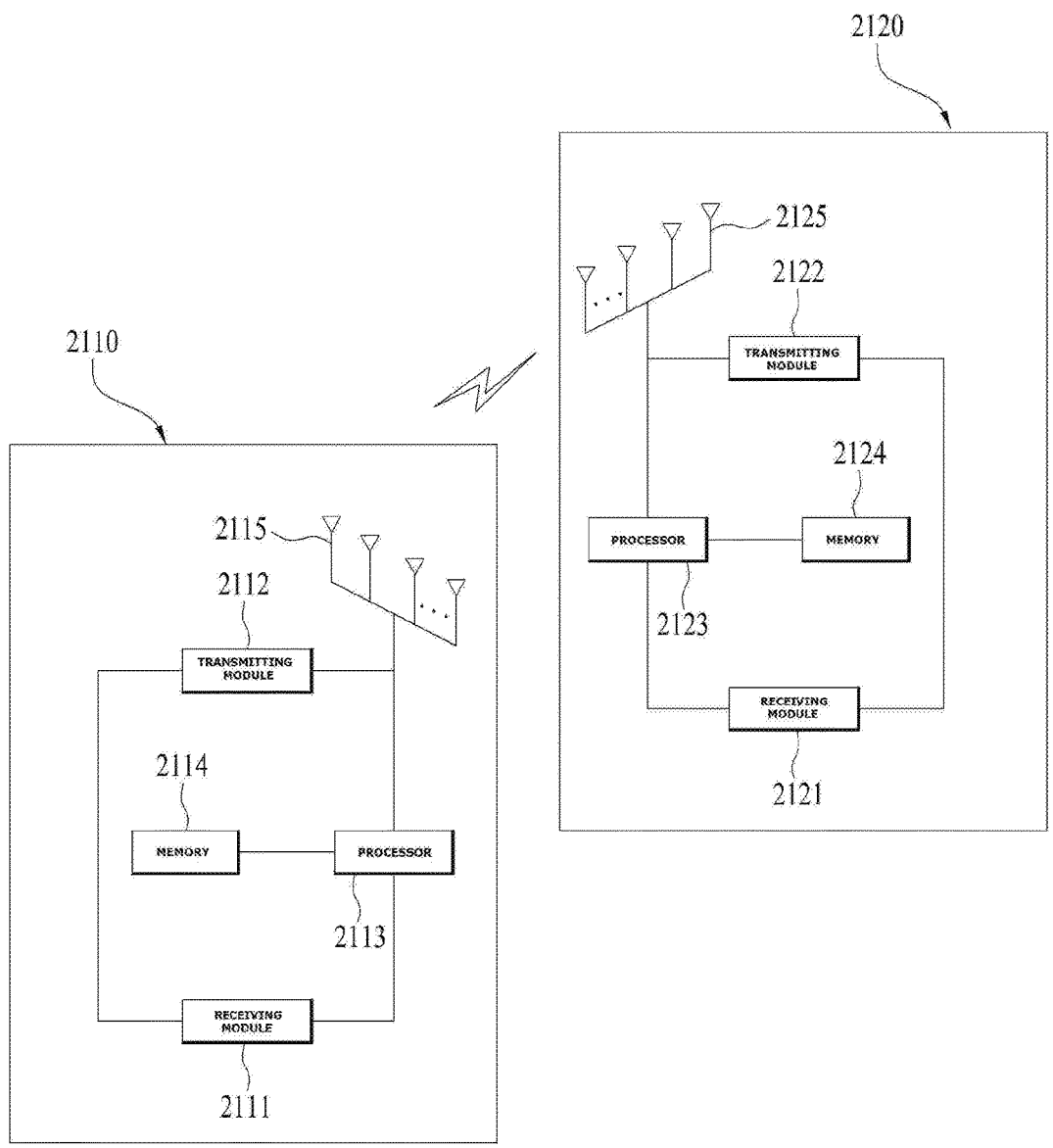
FIG. 21 is a diagram illustrating a wireless communication system including an eNB device and a UE device according to the present invention.

FIG. 21 is a diagram illustrating a wireless communication system including an eNB device and a UE device according to the present invention.

Referring to FIG. 21, an eNB device 2110 according to the present invention may include a receiving module 2111, a transmitting module 2112, a processor 2121, a memory 2114, and a plurality of antennas 2115. The plurality of antennas 2115 may refer to an eNB device for supporting MIMO transceiving. The receiving module 2111 may receive various signals, data, and information on uplink from one or more of a UE and a relay. The transmitting module 2112 may transmit various signals, data, and information on downlink to one or more of a UE and a relay. The processor 2121 may control an overall operation of the eNB device 2110.

The processor 2121 of the eNB device 2110 may perform a function of processing calculation of information received by the eNB device 2110, information to be externally transmitted, and so on and the memory 2114 may store the calculation-processed information and so on for a predetermined time period and may be replaced with a component such as a buffer (not shown) or the like. Here, the memory 2114 may include a caching memory for performing caching according to the present invention.

Referring to FIG. 21, a UE device 2120 according to the present invention may include a receiving module 2121, a transmitting module 2122, a processor 2133, a memory 2124, and a plurality of antennas 2125. The plurality of antennas 2125 refers to a UE device for supporting MIMO transceiving. The receiving module 2121 may include a first receiving module and a second receiving module, the first receiving module may receive various signals, data, and information on downlink from an eNB, and the second receiving module may receive various signals, data, and information on uplink from a UE. The transmitting module 2122 may include a first transmitting module and a second transmitting module, the first transmitting module may transmit various signals, data, and information on uplink to an eNB, and the second transmitting module may transmit various signals, data, and information on downlink to a UE. The processor 2133 may control an overall operation of the UE device 2120.

The processor 2133 of the UE device 2120 may perform a function of processing calculation of information received by the UE device 2120, information to be externally transmitted, and so on and the memory 2124 may store the calculation-processed information and so on for a predetermined time period and may be replaced with a component such as a buffer (not shown) or the like.

With regard to detailed components of the above eNB device and UE, features described with regard to the aforementioned various embodiments of the present invention may be independently applied or two or more embodiments may be simultaneously applied and, a repeated description will be omitted for clarity.

The description of the eNB device 2110 of FIG. 21 may be applied to a relay that autonomously controls a cell.

Figure 22:
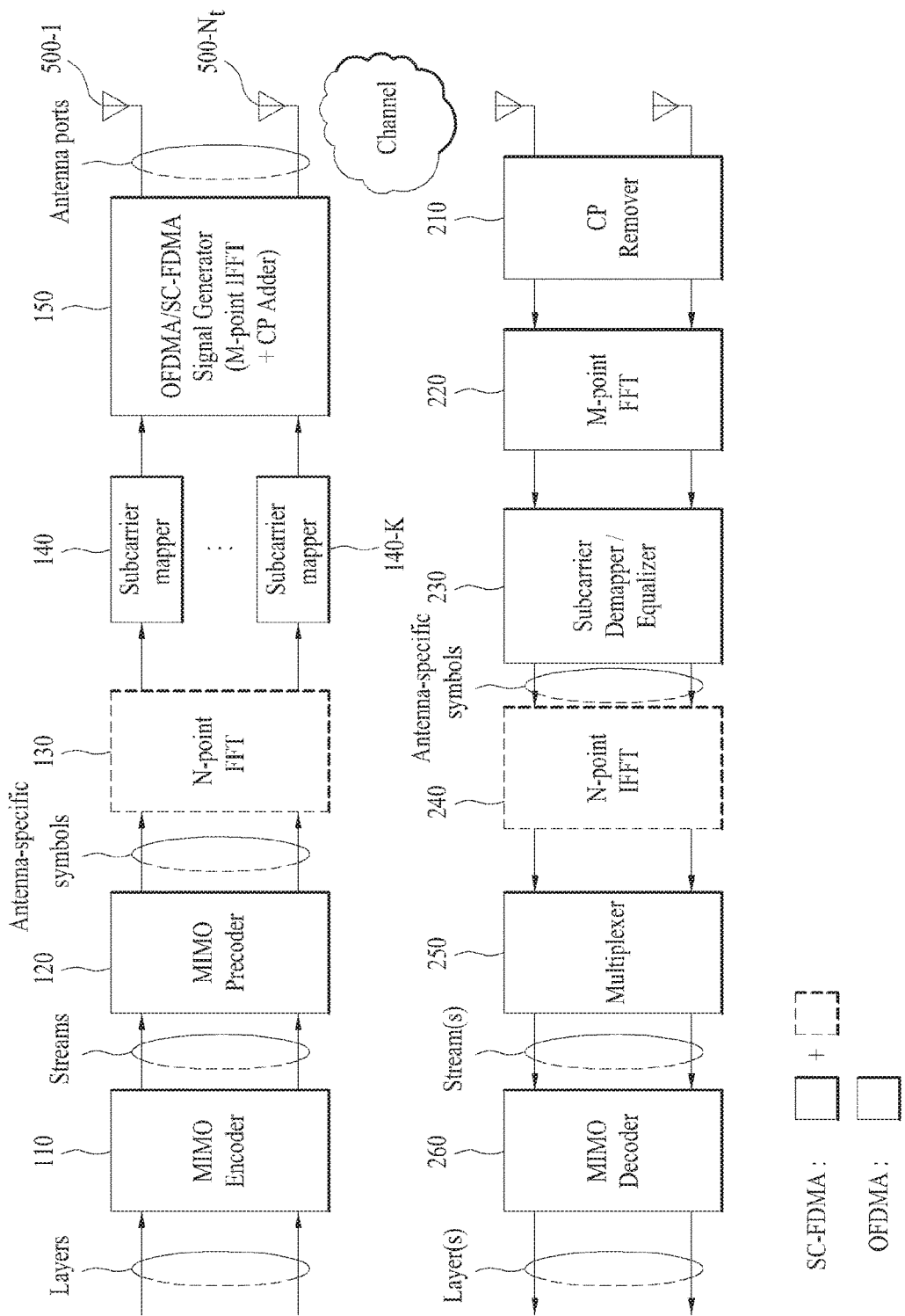
FIG. 22 is a diagram illustrating an example of a transmitting module in a UE device and an eNB.

FIG. 22 is a diagram illustrating an example of a transmitting module in a UE device and an eNB. With reference to FIG. 22, an operation of the transmitting module will be described below in detail.

OFDMA transmitters 100a and 100b may include a MIMO encoder, a MIMO precoder, a subcarrier mapper, an orthogonal frequency division multiplexing access (OFDMA) signal generator, and Nt transmission antennas.

A MIMO encoder 110 may encode a data stream to be transmitted according to a predetermined coding method to form coded data and modulate the coded data to arrange the data as symbols for representing a position on signal constellation. The data stream as input to the MIMO encoder 110 may be obtained by applying various signal processing processes such as channel encoding, interleaving, and scrambling to a data block received from a medium access control (MAC) layer. The data stream may also be referred to as a codeword or a layer and may be equivalent to a data block provided by a MAC layer. The data block provided by the MAC layer may also be referred to as a transfer block. A modulation scheme is not limited and m-phase shift keying (m-PSK), m-quadrature amplitude modulation (m-QAM), and so on may be used in modulation of the coded data. For modulation of the coded data, the MIMO encoder 110 may include a modulator as an independent module. The MIMO encoder 110 may define a MIMO stream of an input symbol to the MIMO precoder 120 such that the MIMO precoder 120 distributes an antenna-specific symbol to a path of a corresponding antenna. The MIMO stream refers to an information path input to the MIMO precoder 120. An information path prior to the MIMO precoder 120 may be considered as a virtual antenna or a MIMO stream. In order to define a MIMO stream of a symbol, the MIMO encoder 110 may include a MIMO stream mapper as an independent module.

The MIMO precoder 120 may process an input symbol using a MIMO method according to a multiple transmission antenna to output specific symbols and distribute the antenna-specific symbols to corresponding subcarrier mappers 140-1, . . . , 140-K. That is, mapping to an antenna of a MIMO stream may be performed by the MIMO precoder 120. The MIMO precoder 120 may multiply output x of the MIMO encoder 110 and a Nt×Mt precoding matrix W to output a Nt×MF matrix z.

The subcarrier mappers 140-1, . . . , 140-K may assign an antenna-specific symbol to an appropriate subcarrier and multiplex the symbol according to a UE device. The subcarrier mappers 140-1, . . . , 140-K may include a LRU allocation block (not shown) of dividing a modulated symbol into segments with a LRU size and, then, allocating each segment to LRU. The subcarrier mappers 140-1, . . . , 140-K may include a mapping block (not shown) for mapping LRU to a data burst. The data burst may be allocated to PRU in a physical frequency domain. Accordingly, the subcarrier mappers 140-1, . . . , 140-K may perform a function of mapping modulated data to a subcarrier according to a mapping relationship between LRU and PRU.

An OFDMA signal generator 150 may modulate an antenna-specific symbol using an OFDM method to output an OFDMA symbol. The OFDMA signal generator 150 may perform inverse fast Fourier transform (IFFT) on the antenna-specific symbol and a cyclic prefix (CP) may be inserted into a time domain symbol on which IFFT is performed. The OFDMA symbol may be transmitted to a receiving device through each of transmission antennas 500-1, . . . , 500-Nt via digital-to-analog conversion, frequency uplink conversion, and so on. The OFDMA signal generator 150 may include an IFFT module, a CP inserter, a digital-to-analog converter (DAC), a frequency uplink converter, and so on.

A signal processing procedure of an OFDMA receiver may be oppositely configured to that of an OFDMA transmitter. In detail, the OFDMA receiver may perform decoding and demodulation on a radio signal received from antennas 500a and 500b from the outside and may transmit the radio signal to a corresponding processor. The antennas 500a and 500b connected to an OFDMA receiver may include Nr multiple reception antennas and each of signals received through a reception antenna may be restored to a baseband signal and, then, may be restored to a data stream to be originally transmitted by transmitters 100a and 100b through multiplexing and MIMO decoding. The OFDMA receiver may include signal restorers 210 to 230 for restoring a received signal to a baseband signal, a multiplexer 250 for combining and multiplexing received and processed signals, and a MIMO decoder 260 for restoring a signal stream to a data stream, and a signal restorer, a multiplexer, and a MIMO decoder may be configured as one module obtained by integrating these functions or respective independent modules. In more detail, the signal restorer may include an analog-to-digital converter (ADC) for converting an analog signal into a digital signal, a CP remover 210 for removing a CP from the digital signal, an FFT module 220 for applying fast Fourier transfer (FFT) with a CP removed therefrom to output a frequency domain symbol, and a subcarrier demapper/equalizer 230 for restoring the frequency domain symbol to an antenna-specific symbol. The antenna-specific symbol may be restored to a MIMO stream by the multiplexer 250 and the MIMO stream may be restored to a data stream to be originally transmitted by a transmitting device, by the MIMO decoder 260.

The SC-FDMA transmitter may further include an FFT module 210 prior to the subcarrier mappers 140-1, . . . , 140-K compared with an OFDMA transmitter. The SC-FDMA transmitter may spread a plurality of data items to a frequency domain via FFT prior to IFFT processing to remarkably reduce a peak-to-average power ratio (PARR) of a transmitted signal compared with an OFDMA method. The SC-FDMA receiver may further include an IFFT module 240 after a subcarrier demapper 230 compared with an OFDMA receiver. A signal processing procedure of a SC-FDMA receiver may be oppositely configured to that of a SC-FDMA transmitter.

A process of each of a transmitting device and a receiving device may be connected to a corresponding transmitter and may control the aforementioned operations of components. For reference, although FIG. 14 illustrates the case in which the MIMO encoder 110, the MIMO precoder 120, the subcarrier mappers 140-1, . . . , 140-K, and the OFDMA/SC-FDMA signal generator 150 are included in the transmitters 100*a* and 100*b*, the processor of the transmitting device may include the encoder 110, the precoder 120, the FFT module 210, the subcarrier mappers 140-1, . . . , 140-K, and the OFDMA/SC-FDMA signal generator 150. Similarly, although FIGS. 2 and 3 illustrate the case in which a signal restorer, a multiplexer, and a MIMO decoder are included in a receiver, a processor of a receiving device may include the signal restorer, the multiplexer, and the MIMO decoder. Hereinafter, for convenience of description, the case in which the encoder 110, the precoder 120, the subcarrier mappers 140-1, . . . , 140-K, and the OFDMA/SC-FDMA signal generator 150 are included in the transmitters 100*a* and 100*b* separated from a processor for controlling operations thereof and the signal restorer, the multiplexer, and the channel demodulator are included in a receiver separated from a processor for controlling operations thereof will be described. However, exemplary embodiments of the present invention may also be applied in the same way to both the case in which the encoder 110, the precoder 120, the FFT module 210, the subcarrier mappers 140-1, . . . , 140-K, and the OFDMA/SC-FDMA signal generator 150 are included in a processor and the case in which a signal restorer, a multiplexer, and a MIMO decoder are included in a processor.

The above-described embodiments of the present invention may be implemented through various means. For example, the embodiments of the present invention may be implemented by hardware, firmware, software, or a combination thereof.

In hardware implementation, a scheme according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In firmware or software implementation, a scheme according to embodiments of the present invention may be implemented in the form of a module, a procedure, a function, etc. performing a function or an operation described above. Software code may be stored in a memory unit and executed by a processor. The memory unit may be located inside of the processor or outside thereof to transmit and receive data to and from the processor via various known means.

Detailed description of the preferred embodiments of the present invention disclosed as above is provided so that those skilled in the art may implement and carry out the present invention. Although description has been made by referring to the preferred embodiments of the present invention, it is understood that those skilled in the art may variously correct and modify the present invention within the scope of the present invention. For example, those skilled in the art may use the configurations described in the above-described embodiments by combining the configurations. Therefore, the present invention is not limited to the embodiments mentioned above, and is intended to include the widest scope matching the principles and new characteristics disclosed herein.

The present invention may be embodied in other specific forms without departing from the spirit and characteristics of the present invention. Thus, the descriptions are to be considered in all respects as illustrative and not restrictive. The scope of the present invention should be determined by reasonable interpretation of the appended claims and all change which comes within the equivalent scope of the invention are within the scope of the invention. The present invention is not limited to the embodiments mentioned above, and is intended to include the widest scope matching the principles and new characteristics disclosed herein. In addition, some claims not explicitly referring to one another in the claims may be combined to constitute an embodiment or to be included as a new claim by means of amendment after the application is filed.

INDUSTRIAL APPLICABILITY

The embodiments of the present invention described above are applicable to various mobile communication systems.

The invention claimed is:

1. A method of transmitting data by a base station (BS) in a wireless communication system for performing a CoMP operation using a cache, the method comprising:
    determining a transmission mode among a plurality of transmission modes based on at least one data stored in the cache;
    determining data to be transmitted in the transmission mode; and
    transmitting the data based on a cooperative transmission beamforming vector and the determined transmission mode,
    wherein the transmission mode comprises a first mode for cooperatively performing data transmission between cooperative BSs, a second mode for sharing channel information between the cooperative BSs and cooperatively performing scheduling, and a third mode obtained by combining the first mode and the second mode,
    wherein the cooperative transmission beamforming vector of the transmitted data is determined such that data transmission power is minimized while satisfying minimum SINR (Signal to Interference plus Noise Ratio) required by a reception user equipment (UE), and
    wherein the cooperative transmission beamforming vector is determined to satisfy a following condition;
    the condition is $$\min_{V_{U_k}} \sum_{k=1}^{k} |V_{G_k}|^2$$

$$\text{s.t.} \quad \frac{|U_k^H H_{k,G_k} V_{G_k}|^2}{\sum_{j \neq k} |U_k^H H_{k,G_j} V_{G_j}|^2 + |U_k^H n_k|^2} \geq 2^{\mu \pi_k} - 1;$$

and the $V_{G_k}$ is a cooperative transmission beamforming vector formed by BSs that cooperate with each other in order to transmit information to a $k^{th}$ UE, $U_k$ is a reception beamforming vector of a $k^{th}$ UE, $H_{k,G_k}$ is a channel gain between corresponding cooperative BSs and a $k^{th}$ UE, $n_{k'}$ is noise of a $k^{th}$ UE reception end, and $\mu_{l'}$ is minimum spectrum efficiency required to detect $l^{th}$ data.

2. The method according to claim 1, wherein, when the at least one data stored in the cache comprises data requested by the reception UE of each of the cooperative BSs, the transmission mode is determined as the first mode.

3. The method according to claim 1, wherein, when the at least one data stored in the cache does not comprise at least one of data requested by the reception UE of each of the cooperative BSs, the transmission mode is determined as the second mode or the third mode.

4. The method according to claim 3, wherein:
the data is determined as data with a largest number of stored parity bits of the at least one data stored in the cache; and
a transmission mode of the data is the third mode.

5. The method according to claim 4, wherein, according to the third mode, when a serving cell of a UE that makes a request for the data is the BS, the BS operates in the first mode, and when the serving cell of the UE that makes a request for the data is not the BS, the BS operates in the second mode.

6. The method according to claim 1, wherein the at least one data is encoded based on maximum distance separable (MDS) coding.

7. The method according to claim 1, further comprising:
encoding data stored in the cache to a parity bit; and
modulating the parity bit based on adaptive modulation and coding.

8. The method according to claim 1, wherein the first mode is an operation mode for performing joint processing and the second mode is an operation mode for performing cooperative scheduling and beamforming.

9. A method of receiving data by a user equipment (UE) in a wireless communication system for performing a CoMP operation using a cache, the method comprising:
receiving a parity bit of data based on a cooperative transmission beamforming vector from a serving base station (BS) that operates in a specific transmission mode among a plurality of transmission modes; and
restoring the data from the parity bit,
wherein the plurality of transmission modes comprise a first mode for cooperatively performing data transmission between cooperative BSs, a second mode for sharing channel information between the cooperative BSs and cooperatively performing scheduling, and a third mode obtained by combining the first mode and the second mode,
wherein the cooperative transmission beamforming vector of the transmitted data is determined such that data transmission power is minimized while satisfying minimum SINR (Signal to Interference plus Noise Ratio) required by the UE, and
wherein the cooperative transmission beamforming vector is determined to satisfy a following condition;
the condition is $$\min_{V_{G_k}} \sum_{k=1}^{K} |V_{G_k}|^2$$

$$\text{s.t.} \quad \frac{|U_k^H H_{k,G_k} V_{G_k}|^2}{\sum_{j \neq k} |U_k^H H_{k,G_j} V_{G_j}|^2 + |U_k^H n_k|^2} \geq 2^{\mu \pi_k} - 1;$$

and the $V_{G_k}$ is a cooperative transmission beamforming vector formed by BSs that cooperate with each other in order to transmit information to a $k^{th}$ UE, $U_k$ is a reception beamforming vector of a $k^{th}$ UE, $H_{k,G_k}$ is a channel gain between corresponding cooperative BSs and a $k^{th}$ UE, $n_{k'}$ is noise of a $k^{th}$ UE reception end, and $\mu_{l'}$ is minimum spectrum efficiency required to detect $l^{th}$ data.

10. A base station (BS) for transmitting data in a wireless communication system for performing a CoMP operation using a cache, the BS comprising:
a processor configured to determine a transmission mode among a plurality of transmission modes based on at least one data stored in the cache and to determine data to be transmitted in the transmission mode; and
a transmitter configured to transmit the data based on a cooperative transmission beamforming vector and the determined transmission mode,
wherein the transmission mode comprises a first mode for cooperatively performing data transmission between cooperative BSs, a second mode for sharing channel information between the cooperative BSs and cooperatively performing scheduling, and a third mode obtained by combining the first mode and the second mode,
wherein the cooperative transmission beamforming vector of the transmitted data is determined such that data transmission power is minimized while satisfying minimum SINR (Signal to Interference plus Noise Ratio) required by a reception user equipment (UE), and
wherein the cooperative transmission beamforming vector is determined to satisfy a following condition;
the condition is $$\min_{V_{G_k}} \sum_{k=1}^{K} |V_{G_k}|^2$$

$$\text{s.t.} \quad \frac{|U_k^H H_{k,G_k} V_{G_k}|^2}{\sum_{j \neq k} |U_k^H H_{k,G_j} V_{G_j}|^2 + |U_k^H n_k|^2} \geq 2^{\mu \pi_k} - 1;$$

and the $V_{G_k}$ is a cooperative transmission beamforming vector formed by BSs that cooperate with each other in order to transmit information to a $k^{th}$ UE, $U_k$ is a reception beamforming vector of a $k^{th}$ UE, $H_{k,G_k}$ is a channel gain between corresponding cooperative BSs and a $k^{th}$ UE, $n_{k'}$ is noise of a $k^{th}$ UE reception end, and $\mu_{l'}$ is minimum spectrum efficiency required to detect $l^{th}$ data.

11. A user equipment (UE) for receiving data in a wireless communication system for performing a CoMP operation using a cache, the UE comprising:
a receiver configured to receive a parity bit of data based on a cooperative transmission beamforming vector from a serving base station (BS) that operates in a specific transmission mode among a plurality of transmission modes; and
a processor configured to restore the data from the parity bit,
wherein the plurality of transmission modes comprise a first mode for cooperatively performing data transmission between cooperative BSs, a second mode for sharing channel information between the cooperative BSs and cooperatively performing scheduling, and a third mode obtained by combining the first mode and the second mode,
wherein the cooperative transmission beamforming vector of the transmitted data is determined such that data transmission power is minimized while satisfying minimum SINR (Signal to Interference plus Noise Ratio) required by the UE, and wherein the cooperative transmission beamforming vector is determined to satisfy a following condition; the condition is $$\min_{V_{G_k}} \sum_{k=1}^{K} |V_{G_k}|^2$$

$$s.t. \frac{|U_k^H H_{k,G_k} V_{G_k}|^2}{\sum_{j \neq k} |U_k^H H_{k,G_j} V_{G_j}|^2 + |U_k^H n_k|^2} \geq 2^{\mu_{\pi_k}} - 1;$$

and
the $V_{G_k}$ is a cooperative transmission beamforming vector formed by BSs that cooperate with each other in order to transmit information to a $k^{th}$ UE, $U_k$ is a reception beamforming vector of a $k^{th}$ UE, $H_{k,G_k}$ is a channel gain between corresponding cooperative BSs and a $k^{th}$ UE, $n_{k'}$ is noise of a $k^{th}$ UE reception end, and $\mu_{l'}$ is minimum spectrum efficiency required to detect $l^{th}$ data.

* * * * *